United States Patent
Patel et al.

(10) Patent No.: US 10,264,541 B2
(45) Date of Patent: Apr. 16, 2019

(54) OPERATING MODE COORDINATION ON A SHARED COMMUNICATION MEDIUM

(71) Applicant: QUALCOMM Incorporated, San Diego, CA (US)

(72) Inventors: Chirag Sureshbhai Patel, San Diego, CA (US); Tao Luo, San Diego, CA (US); Andrei Dragos Radulescu, San Diego, CA (US); Ahmed Kamel Sadek, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/421,080

(22) Filed: Jan. 31, 2017

(65) Prior Publication Data

US 2017/0223737 A1   Aug. 3, 2017

Related U.S. Application Data

(60) Provisional application No. 62/290,433, filed on Feb. 2, 2016, provisional application No. 62/326,524, filed on Apr. 22, 2016.

(51) Int. Cl.
*H04L 12/28* (2006.01)
*H04W 56/00* (2009.01)
(Continued)

(52) U.S. Cl.
CPC ....... *H04W 56/0015* (2013.01); *H04L 5/0048* (2013.01); *H04W 16/14* (2013.01);
(Continued)

(58) Field of Classification Search
USPC ..................................... 370/278, 329, 445
See application file for complete search history.

(56) References Cited

U.S. PATENT DOCUMENTS

| 7,054,640 B2 * | 5/2006 | Bing ..................... H04W 16/04 455/450 |
| 2007/0147240 A1 * | 6/2007 | Benveniste ........... H04W 28/24 370/230 |

(Continued)

FOREIGN PATENT DOCUMENTS

| EP | 2557883 A2 | 2/2013 |
| WO | 2015012102 A1 | 1/2015 |
| WO | 2015157450 A1 | 10/2015 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP Standard; 3GPP TS 36.300, 3rd Generation Partnership Project (3GPP); 650, Route Des Lucioles; Sophia-Antipolis; Valbonne—France, No. V13.2.0, Dec. 2015 (Dec. 2015), pp. 1-290.

(Continued)

*Primary Examiner* — John Pezzlo
(74) *Attorney, Agent, or Firm* — Muncy, Geissler, Olds & Low, PC

(57) ABSTRACT

Techniques for intra- and inter-operator coordination on a shared communication medium are disclosed. A central coordination server may send an operating mode information message to coordinate operation of different points on the communication medium. An access point may receive such an operating mode information message and adjust one or more communication parameters. An access point may determine a level of timing synchronization with neighboring access points and send a synchronization advertisement message to an access terminal. An access terminal may receive a synchronization advertisement message and perform one or more measurements of the neighboring access points.

30 Claims, 17 Drawing Sheets

(51) Int. Cl.
  *H04W 24/08* (2009.01)
  *H04W 72/04* (2009.01)
  *H04L 5/00* (2006.01)
  *H04W 16/14* (2009.01)
  *H04W 24/02* (2009.01)
  *H04W 74/08* (2009.01)
  *H04W 74/02* (2009.01)
  *H04J 1/16* (2006.01)
  *H04W 88/08* (2009.01)

(52) U.S. Cl.
  CPC ........... *H04W 24/02* (2013.01); *H04W 24/08* (2013.01); *H04W 56/002* (2013.01); *H04W 72/0446* (2013.01); *H04W 74/02* (2013.01); *H04W 74/0808* (2013.01); *H04W 88/08* (2013.01)

(56) References Cited

U.S. PATENT DOCUMENTS

| | | | |
|---|---|---|---|
| 2011/0026421 | A1 | 2/2011 | Luo et al. |
| 2012/0275362 | A1 | 11/2012 | Park et al. |
| 2015/0215879 | A1 | 7/2015 | Zhu et al. |
| 2015/0223077 | A1 | 8/2015 | Fan et al. |
| 2015/0312789 | A1 | 10/2015 | You et al. |
| 2016/0157197 | A1 | 6/2016 | Takeda et al. |
| 2016/0316424 | A1* | 10/2016 | Jia .................... H04L 1/1607 |
| 2017/0118690 | A1 | 4/2017 | Patel et al. |
| 2017/0222771 | A1 | 8/2017 | Chendamarai et al. |
| 2017/0223651 | A1 | 8/2017 | Patel et al. |
| 2017/0238306 | A1 | 8/2017 | Patel et al. |
| 2017/0311230 | A1 | 10/2017 | Yang et al. |
| 2017/0311316 | A1 | 10/2017 | Chendamarai et al. |
| 2017/0318490 | A1 | 11/2017 | Yang et al. |
| 2017/0339704 | A1 | 11/2017 | Matsumoto et al. |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP Standard; 3GPP TS 36.331, 3rd Generation Partnership Project (3GPP); 650, Route Des Lucioles; Sophia-Antipolis; Valbonne—France, No. V13.0.0, Dec. 2015 (Dec. 2015), pp. 1-507.

3GPP, "3rd Generation Partnership Project, Technical Specification Group Radio Access Network, Study on Licensed-Assisted Access to Unlicensed Spectrum; (Release 13)", 3GPP Draft, TR 36 889 V0 2 2, 3rd Generation Partnership Project (3GPP), Mobile Competence Centre, 650, Route Des Lucioles, F-06921 Sophia-Antipolis Cedex, France, Feb. 16, 2015 (Feb. 16, 2015), XP050949383, Retrieved from the Internet: URL:http://www.3gpp.org/ftp/tsg_ran/WG1_RL1/TSGR1_80/Docs/ [retrieved on Feb. 16, 2015].

International Search Report and Written Opinion—PCT/US2017/016041—ISA/EPO—dated May 17, 2017.

NTT DOCOMO: "Views on Detailed Design of Discovery Signal(s)", 3GPP Draft, R1-143215 Views on Discovery Signal Design R2, 3rd Generation Partnership Project (3GPP), Mobile Competence Centre, 650, Route Des Lucioles, F-06921 Sophia-Antipolis Cedex, France, vol. RAN WG1, no. Dresden, Germany, Aug. 18, 2014-Aug. 22, 2014, Aug. 17, 2014 (Aug. 17, 2014), XP050788692. Retrieved from the Internet: URL: http://www.3gpp.org/ftp/Meetings_3GPP_SYNC/RAN1/Docs/ [retrieved on Aug. 17, 2014].

Panasonic: "DRS Design for LAA", 3GPP Draft, R1-152692, 3rd Generation Partnership Project (3GPP), Mobile Competence Centre, 650, Route Des Lucioles, F-06921 Sophia-Antipolis Cedex, France, vol. RAN WG1. no. Fukuoka, Japan, May 25, 2015-May 29, 2015, May 15, 2015 (May 15, 2015), XP050972657, Retrieved from the Internet: URL: http://www.3gpp.org/ftp/tsg_ran/WG1_RL1/TSGR1_81/Docs/ [retrieved on May 15, 2015].

* cited by examiner

OPERATING MODE COORDINATION ON A SHARED COMMUNICATION MEDIUM

CROSS-REFERENCE TO RELATED APPLICATIONS

The present application claims the benefit of U.S. Provisional Application No. 62/326,524, entitled "Techniques for Coordinating Inter-Operator on a Shared Radio Frequency Spectrum Band," filed Apr. 22, 2016, and U.S. Provisional Application No. 62/290,433, entitled "Mobility Measurements on a Shared Communication Medium," filed Feb. 2, 2016, each assigned to the assignee hereof and expressly incorporated herein by reference in its entirety.

The present application is also related to the following co-pending U.S. patent application(s): "Timing Synchronization Coordination on a Shared Communication Medium," having 15/412,146, filed concurrently herewith, assigned to the assignee hereof, and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell access points and operators as their devices compete for access to shared resources.

SUMMARY

The following summary is an overview provided solely to aid in the description of various aspects of the disclosure and is provided solely for illustration of the aspects and not limitation thereof.

In one example, a communication method is disclosed. The method may include, for example, receiving, at a central coordination server from a first access point associated with a first operator, information regarding operation of the first access point on a shared communication medium; and sending, from the central coordination server to a second access point associated with a second operator, an operating mode information message based on the received information to coordinate operation of the first and second access points on the communication medium.

In another example, a communication apparatus is disclosed. The apparatus may include, for example, at least one processor, at least one memory coupled to the at least one processor, and at least one transceiver. The at least one transceiver may be configured to receive, at a central coordination server from a first access point associated with a first operator, information regarding operation of the first access point on a shared communication medium. The at least one processor and the at least one memory may be configured to direct the at least one transceiver to send, from the central coordination server to a second access point associated with a second operator, an operating mode information message based on the received information to coordinate operation of the first and second access points on the communication medium.

In another example, another communication apparatus is disclosed. The apparatus may include, for example, means for receiving, at a central coordination server from a first access point associated with a first operator, information regarding operation of the first access point on a shared communication medium; and means for sending, from the central coordination server to a second access point associated with a second operator, an operating mode information message based on the received information to coordinate operation of the first and second access points on the communication medium.

In another example, a transitory or non-transitory computer-readable medium is disclosed, which, when executed by at least one processor, causes the at least one processor to perform operations for communication. The computer-readable medium may include, for example, code for receiving, at a central coordination server from a first access point associated with a first operator, information regarding operation of the first access point on a shared communication medium; and code for sending, from the central coordination server to a second access point associated with a second operator, an operating mode information message based on the received information to coordinate operation of the first and second access points on the communication medium.

In another example, another communication method is disclosed. The method may include, for example, receiving, at a first access point associated with a first operator, directly or indirectly from a central coordination server, an operating mode information message for coordinating operation of the first access point on a shared communication medium with a second access point associated with a second operator; and adjusting one or more communication parameters of the first access point based on the received operating mode information message.

In another example, another communication apparatus is disclosed. The apparatus may include, for example, at least one processor, at least one memory coupled to the at least one processor, and at least one transceiver. The at least one transceiver may be configured to receive, at a first access point associated with a first operator, directly or indirectly from a central coordination server, an operating mode information message for coordinating operation of the first access point on a shared communication medium with a second access point associated with a second operator. The at least one processor and the at least one memory may be configured to adjust one or more communication parameters of the first access point based on the received operating mode information message.

In another example, another communication apparatus is disclosed. The apparatus may include, for example, means for receiving, at a first access point associated with a first operator, directly or indirectly from a central coordination server, an operating mode information message for coordinating operation of the first access point on a shared communication medium with a second access point associated with a second operator; and means for adjusting one or more communication parameters of the first access point based on the received operating mode information message.

In another example, another transitory or non-transitory computer-readable medium is disclosed, which, when executed by at least one processor, causes the at least one processor to perform operations for communication. The computer-readable medium may include, for example, code for receiving, at a first access point associated with a first operator, directly or indirectly from a central coordination server, an operating mode information message for coordinating operation of the first access point on a shared communication medium with a second access point associated with a second operator; and code for adjusting one or more communication parameters of the first access point based on the received operating mode information message.

In another example, another communication method is disclosed. The method may include, for example, determining a level of timing synchronization between a first access point and one or more neighboring access points; and sending, from the first access point to an access terminal, a synchronization advertisement message that identifies the level of timing synchronization.

In another example, another communication apparatus is disclosed. The apparatus may include, for example, at least one processor, at least one memory coupled to the at least one processor, and at least one transceiver. The at least one processor and the at least one memory may be configured to determine a level of timing synchronization between a first access point and one or more neighboring access points. The at least one transceiver may be configured to send, from the first access point to an access terminal, a synchronization advertisement message that identifies the level of timing synchronization.

In another example, another communication apparatus is disclosed. The apparatus may include, for example, means for determining a level of timing synchronization between a first access point and one or more neighboring access points; and means for sending, from the first access point to an access terminal, a synchronization advertisement message that identifies the level of timing synchronization.

In another example, another transitory or non-transitory computer-readable medium is disclosed, which, when executed by at least one processor, causes the at least one processor to perform operations for communication. The computer-readable medium may include, for example, code for determining a level of timing synchronization between a first access point and one or more neighboring access points; and code for sending, from the first access point to an access terminal, a synchronization advertisement message that identifies the level of timing synchronization.

In another example, another communication method is disclosed. The method may include, for example, receiving, at an access terminal from a first access point, a synchronization advertisement message that identifies a level of timing synchronization between the first access point and one or more neighboring access points; and performing, by the access terminal, one or more measurements of the one or more neighboring access points based on the level of timing synchronization.

In another example, another communication apparatus is disclosed. The apparatus may include, for example, at least one processor, at least one memory coupled to the at least one processor, and at least one transceiver. The at least one transceiver may be configured to receive, at an access terminal from a first access point, a synchronization advertisement message that identifies a level of timing synchronization between the first access point and one or more neighboring access points. The at least one processor and the at least one memory may be configured to perform, by the access terminal, one or more measurements of the one or more neighboring access points based on the level of timing synchronization.

In another example, another communication apparatus is disclosed. The apparatus may include, for example, means for receiving, at an access terminal from a first access point, a synchronization advertisement message that identifies a level of timing synchronization between the first access point and one or more neighboring access points; and means for performing, by the access terminal, one or more measurements of the one or more neighboring access points based on the level of timing synchronization.

In another example, another transitory or non-transitory computer-readable medium is disclosed, which, when executed by at least one processor, causes the at least one processor to perform operations for communication. The computer-readable medium may include, for example, code for receiving, at an access terminal from a first access point, a synchronization advertisement message that identifies a level of timing synchronization between the first access point and one or more neighboring access points; and code for performing, by the access terminal, one or more measurements of the one or more neighboring access points based on the level of timing synchronization.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
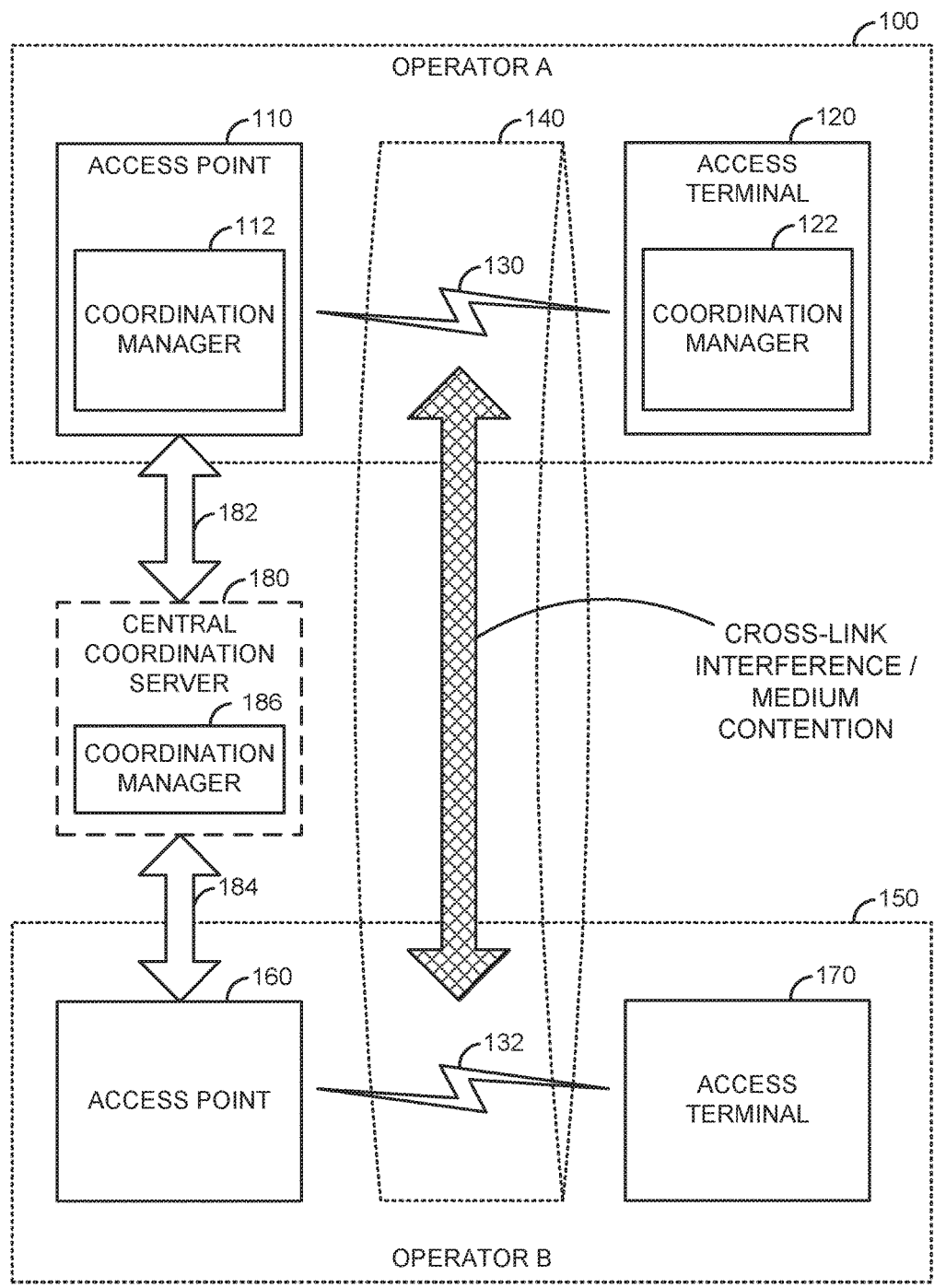
FIG. 1 is a system-level diagram illustrating an example wireless network environment.

The present disclosure relates generally to intra- and inter-operator coordination on a shared communication medium. To facilitate inter-frequency measurements, for example, neighboring access points operating on the shared communication medium may synchronize reference signaling including respective windows in which certain reference signaling is transmitted (e.g., Discovery Reference Signal (DRS) Transmission Windows (DTxW)). This may allow access terminals to more efficiently monitor such signaling. The access points may also advertise information related to reference signaling and DTxW timing to their access terminals, including timing offsets at which neighboring cell DTxWs can be found, indicators as to the level of DTxW synchronization among neighboring cells, and so on.

To more efficiently mitigate interference between devices belonging to different operators, a central coordination controller may be used in conjunction with Over-The-Air (OTA) co-existence mechanisms such as Listen Before Talk (LBT). The central coordination controller may provide instructions or other information to the devices that permit each device to select an appropriate operating mode based on such factors as the presence and/or activity of neighboring devices belonging to a different operator. For example, each device may select a contention scheme and associated parameters based on whether other-operator devices are operating nearby. The central coordination controller may also coordinate various other communication parameters between operators, such as Discovery Reference Signal (DRS) timing parameters, LBT parameters, channel configuration parameters, and so on.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with a Long Term Evolution (LTE) technology or a variant thereof (e.g., MuLTEfire, Licensed Assisted Access (LAA), etc.), while the access point 160 and the access terminal 170 of the operator B system 150 may communicate via the wireless link 132 in accordance with the same LTE technology or a different technology (e.g., Wi-Fi technology) but be deployed by a different operator (e.g., a different company or other entity controlling authorization, system timing, etc.). It will be appreciated that each system may support any number of wireless nodes (access points, access terminals, etc.) distributed throughout a geographic region, with the illustrated entities being shown for illustration purposes only. Instead of LTE technology, persons skilled in the art will appreciate that communications via wireless links 130 and 132 may be configured in accordance with a fifth generation (5G)/new radio (NR) technology or a variant thereof, among others.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

With reference again to FIG. 1, in some deployments, an (optional) central coordination server 180 such as a Spectrum Access System (SAS) may be deployed to help mitigate the interference. The central coordination server 180 may communicate with the operator A system 100 over a respective backhaul link 182 and with the operator B system 150 over a respective backhaul link 184.

As will be described in more detail below, the access point 110, the access terminal 120, and/or the central coordination server 180 may be variously configured in accordance with the teachings herein to provide or otherwise support the coordination techniques discussed briefly above. For example, the access point 110 may include a coordination manager 112, the access terminal 120 may include a coordination manager 122, and the central coordination server 180 may include a coordination manager 186. The coordination manager 112, the coordination manager 122, and/or the coordination manager 186 may be configured in different ways to manage intra- and inter-operator coordination.

Figure 2:
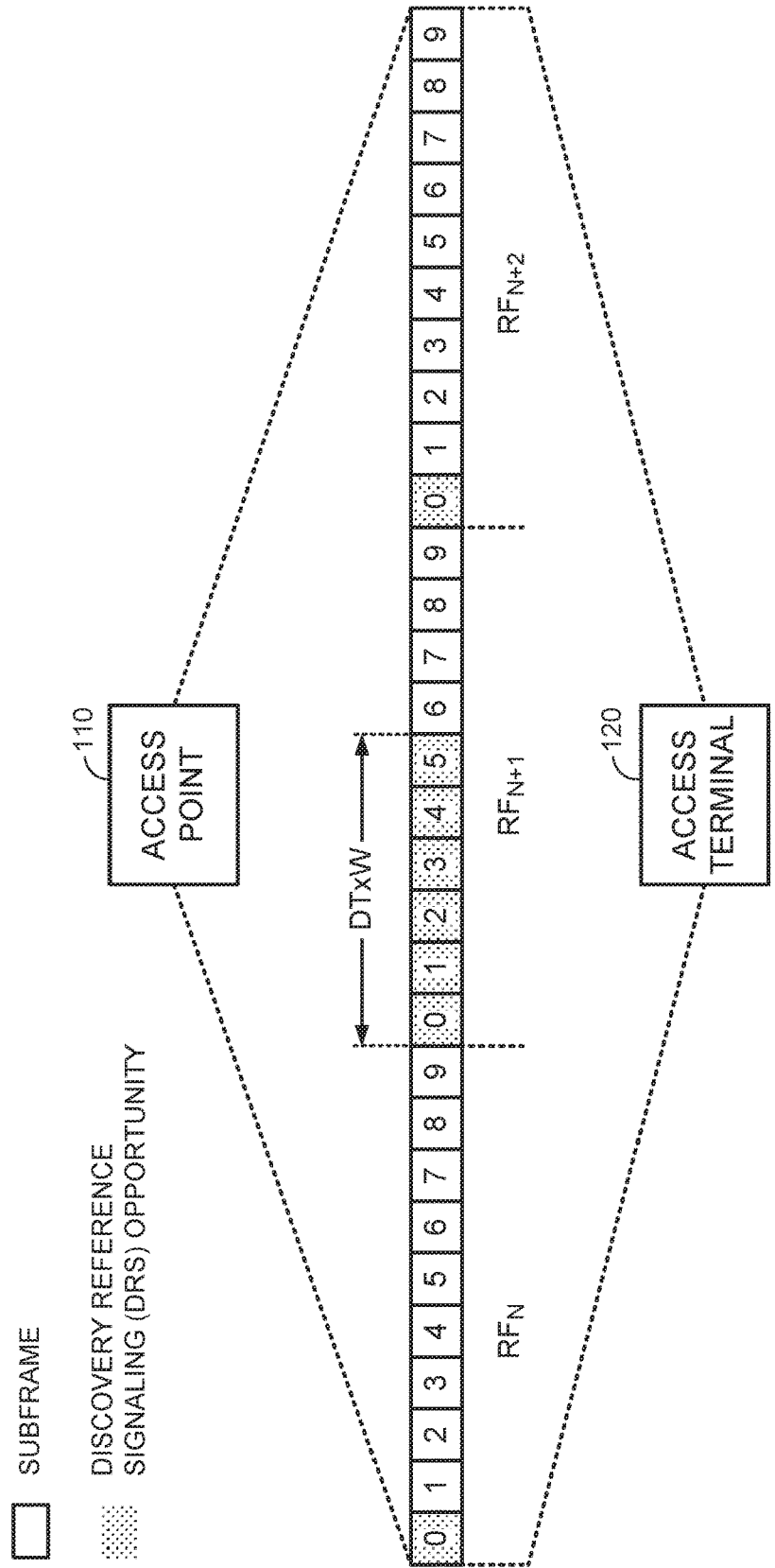
FIG. 2 illustrates an example frame structure.

FIG. 2 illustrates an example frame structure that may be implemented for the primary RAT system 100 on the communication medium 140 to facilitate access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots, and the slots may be further divided into symbol periods (not shown in FIG. 2). As an example, an LTE-based frame structure may include system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location and/or configuration of each subframe may be predetermined (e.g., in relation to an absolute time). Here, if contention-based access is in effect and the access point 110 or the access terminal 120 fails to win contention for a given subframe, for example, that subframe may be silenced. In other designs, however, the frame structure of FIG. 2 may be "floating" in that the location and/or configuration of each subframe may be dynamically determined (e.g., in relation to the point at which access to the communication medium 140 is secured). As an example, the start of a given frame (e.g., $RF_{N+1}$) may be delayed in relation to an absolute time until the access point 110 or the access terminal 120 is able to win contention. As another example, the type of each subframe (downlink, uplink, or special) may be dynamically configured by the access point 110 based on when access to the communication medium 140 is secured (e.g., the next 10 subframes may be designated as DDDDDUUUUU, DDUUUUUUUU, or a different combination subframe types).

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Management (RRM)/Radio Link Monitoring (RLM) measurements), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on.

Different DRS transmission schemes may be implemented to facilitate more robust DRS under different scenarios, such as when contention is required for accessing the communication medium 140. For example, the DRS may be scheduled for transmission periodically (e.g., every 10 ms) in a designated subframe(s) of each radio frame (e.g., subframe SF0) or in a range of such subframes referred to herein as a DRS Transmission Window (DTxW) defined around a designated subframe (e.g., spanning the first six subframes SF0 to SF5 of the radio frame). It will be appreciated that such a DTxW may also be referred to as a serving cell DRS Measurement Timing Configuration (DMTC) window or the like, depending on the RAT employed.

Figure 3:
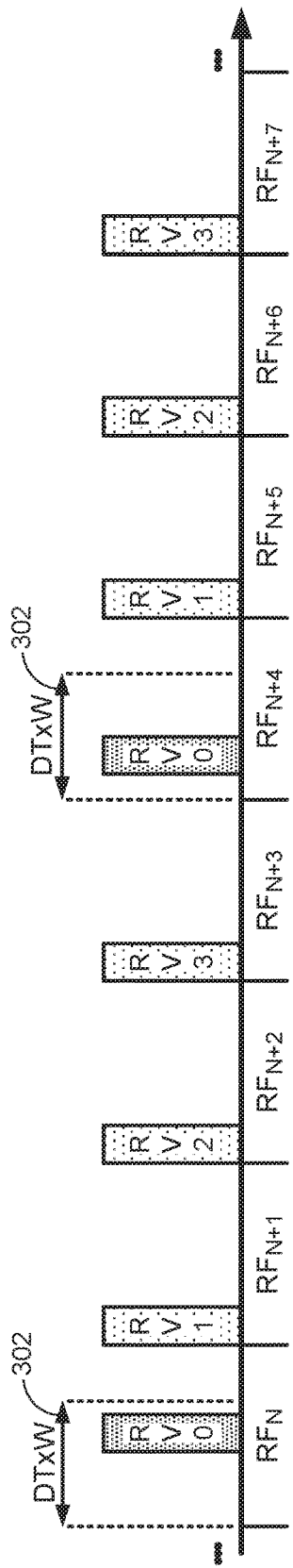
FIG. 3 is a timing diagram illustrating an example Discovery Reference Signal (DRS) transmission scheme.

FIG. 3 is a timing diagram illustrating an example DRS transmission scheme that may be implemented on the communication medium 140. As shown, in some instances, the access point 110 may transmit the DRS opportunistically in a designated subframe when access to the communication medium 140 is available for that designated subframe. Otherwise, when access to the communication medium 140 is not available for the designated subframe, the access point 110 may refrain from transmitting the DRS until the next designated subframe. Opportunistic DRS transmission at a designated subframe is shown by way of example in FIG. 3 at radio frames $RF_{N+1}$, $RF_{N+2}$, $RF_{N+3}$, $RF_{N+5}$, $RF_{N+6}$, and $RF_{N+7}$.

In other instances, however, the access point 110 may transmit the DRS more aggressively, at any time access to the communication medium 140 is available within a larger DTxW 302 and with a higher transmission power if desired. Aggressive DRS transmission within the DTxW 302 is shown by way of example in FIG. 3 at radio frames $RF_N$ and $RF_{N+4}$. The access terminal 120 may be configured to monitor the communication medium 140 for DRS within each defined DTxW 302.

Aggressive transmission and the corresponding DTxW 302 may be scheduled periodically (e.g., every 20 or 40 ms) in designated radio frames, which can be coordinated with the access terminal 120. In the illustrated example, the DTxW 302 is scheduled every fourth radio frame at $RF_N$, $RF_{N+4}$, and so on. It will be appreciated, however, that other configurations may be employed as desired to balance aggressive and opportunistic DRS transmission.

In either case, certain signaling included in the DRS may be transmitted with a corresponding redundancy version (RV), as appropriate, at least for an otherwise common payload. In the illustrated example, such signaling may be transmitted with a first redundancy version (RV0) in a first instance ($RF_N$ within the DTxW 302), a second redundancy version (RV1) in the next instance ($RF_{N+1}$), a third redundancy version (RV2) in the next instance ($RF_{N+2}$), a fourth redundancy version (RV3) in the next instance ($RF_{N+3}$), and repeated from there, as shown when the payload changes (e.g., every fourth radio frame). Use of different redundancy versions may allow for combining gains across time as well as other informational uses.

As will be described in more detail below, the access terminal 120 may need to perform various measurements (e.g., RRM) on not only the DRS transmitted by the access point 110 acting as its serving access point, but also other nearby, "neighboring" access points. These measurements may be utilized to facilitate handover and thereby mobility of the access terminal 120. It may be advantageous to perform measurements, for example, within a DTxW of each neighboring access point for improved reliability, since the DRS in a DTxW may be transmitted more aggressively or with a reference power level more suitable for mobility purposes. However, measurements across several different operating frequencies may incur large delays due to limited transmission opportunities and associated measurement gaps. Moreover, for both inter-frequency and intra-frequency measurements, the DTxW timing (or relative offset) for a given neighboring access point may not be readily apparent. Various techniques are therefore provided herein to control reference signal timing generally, and DTxW timing more specifically, and associated measurements across neighboring access points and the cells they provide.

Figure 4:
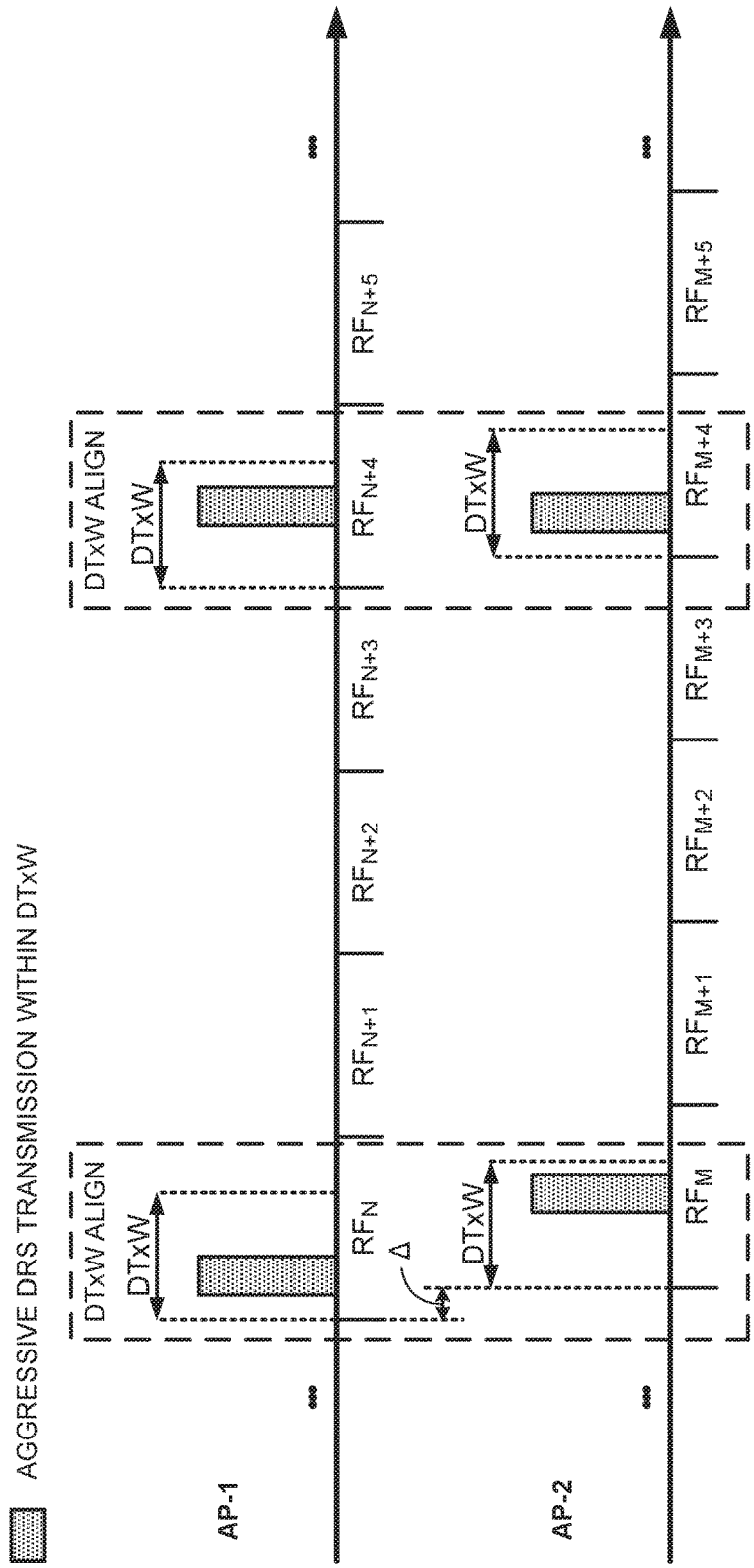
FIG. 4 is a timing diagram illustrating an example reference signal synchronization scheme.

FIG. 4 is a timing diagram illustrating an example reference signal synchronization scheme that may be implemented across neighboring access points on the communication medium 140. DTxW alignment as an example of reference signal synchronization is shown for illustration purposes. In this example, the access point 110 (AP-1) is shown as part of a larger neighborhood that includes another access point (AP-2) operating in accordance with a similar frame structure over several example RF cycles ($RF_M$, $RF_{M+1}$, $RF_{M+2}$, $RF_{M+3}$, $RF_{M+4}$, and $RF_{M+5}$). As an example, the access points may be provided by the same operator (e.g., as part of the operator A system 100).

As shown, the neighboring access points AP-1 and AP-2 may substantially align the timing of their respective DTxW patterns, at least within a margin $\Delta$ (e.g., on the order of a few milliseconds if tight synchronization is not available). While system-wide time and phase synchronization may be impractical in complex deployments, synchronization of at least the DTxW across cells may help to improve the efficiency of measurements such as RRM. For example, if neighboring access points operating cells on a particular frequency have aligned DTxW patterns, the access terminal 120 can potentially measure the DRS transmitted by each of the access points during a given inter-frequency measurement gap, rather than requiring multiple gap configurations.

The synchronization of DTxW patterns may be performed in different ways. As an example, conventional methods for time/frequency synchronization (e.g., via the IEEE 1588 Precision Time Protocol (PTP)) may be employed to identify a common reference time, and an operations, administration, and management (OAM) server/controller or the like (e.g., as part of the central coordination server 180) may configure a synchronized DTxW across cells on the same frequency based on the common reference time. As another example, self-synchronization may be employed in which the access point 110 utilizes Over-The-Air (OTA) listening procedures. Self-synchronization may be advantageous in that it facilitates a more autonomous and self-organizing setup.

For self-synchronization, the access point 110 may utilize Network Listen (NL) functionality or the like to detect the DRS of neighboring cells. The access point 110 may then determine whether the DRS of a given neighboring cell is detected within a DTxW or outside of the DTxW. As an example, the access point 110 may monitor the PSS/SSS sequence of the DRS for a signature associated with the DTxW (e.g., additional symbol periods dedicated to PSS and/or SSS transmission). As another example, the access point 110 may monitor the redundancy version of the PBCH transmission within the DRS for a value associated with the DTxW (e.g., RV0 for a 40 ms periodicity DTxW, RV0 and RV2 for a 20 ms periodicity DTxW, and so on). As another example, the access point 110 may monitor the DTxW configuration broadcast by the neighboring cell. In either case, and especially if the DTxW configuration is not acquired from explicit neighboring cell broadcast, the monitoring may be performed over a number of cycles to determine a beginning and/or end point of the DTxW from the potentially variable subframe locations in which DRS may be detected therein (e.g., based on the earliest and/or latest subframe location in which DRS is detected over several cycles). As an alternative to utilizing a Network Listen function, the access point 110 can configure the access terminal 120 to perform the detection of DTxW timing and report the measured neighboring cell timing to the access point 110. In this case, the configuring may indicate, as an example, the frequencies to measure and possibly also the particular neighbor cells to measure. Furthermore, the measurement report may contain, for example, the determined neighboring cell(s) DTxW timing. For measurement, the access terminal 120 may use the mechanisms described above with respect to Network Listen functionality.

After identifying the DTxW of a neighboring cell on a particular frequency, the access point 110 may align its own DTxW on one or more of its own operating frequencies to help consolidate measurement windows within the network. For example, if the access point 110 operates on a first frequency that is the same frequency as the identified DTxW of the neighbor cell but serves the access terminal 120 on a second frequency that is different from the first frequency, the access point 110 may align its DTxW on the first frequency with the DTxW of the neighbor cell (within a margin $\Delta_1$) to facilitate more efficient inter-frequency measurements for the access terminal 120. The access point 110 may also similarly align its DTxW on the second frequency with which it provides service to the access terminal 120 (within a margin $\Delta_2$, where $\Delta_2$ may be different than $\Delta_1$). However, it may be advantageous to provide a tighter alignment (i.e., $\Delta_1 < \Delta_2$) on the second frequency to condense the inter-frequency measurement gaps of the access terminal 120. In addition or as an alternative, the access point 110 may store the DTxW timing of the neighbor cell for subsequent use (e.g., for configuring measurement gaps for the access terminal 120). As a more general example, it will be appreciated that even if the access terminal 120 was served by another access point on any frequency, it would still benefit from the DTxW alignment achieved by the access point 110 with its neighbor cells on the operating frequencies of the access point 110. The access terminal 120 will be able to achieve better measurement performance when measuring the operating frequencies of the access point 110.

Figure 5:
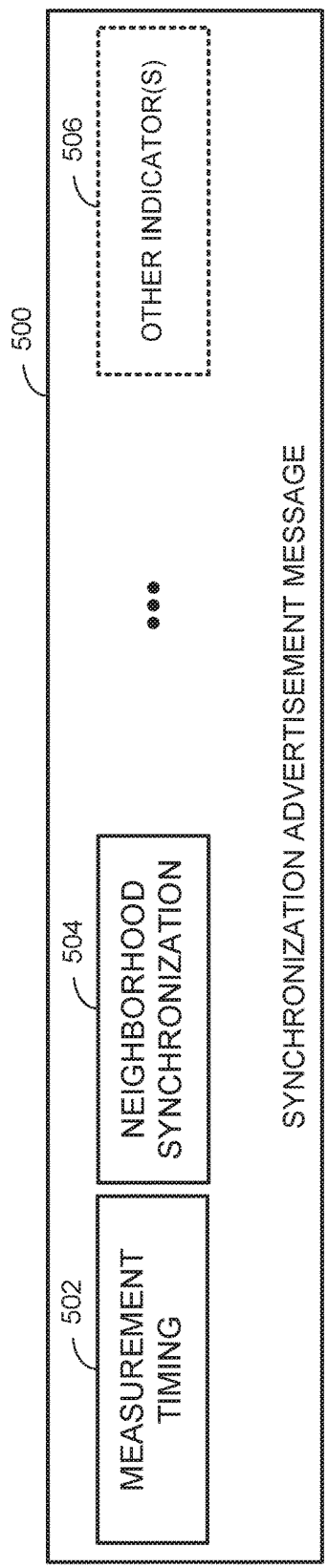
FIG. 5 illustrates an example synchronization advertisement message.

FIG. 5 illustrates an example synchronization advertisement message. A synchronization advertisement message may be used to convey a level of timing synchronization between the access point 110 and one or more neighboring access points. The access point 110 may accordingly determining the level of timing synchronization between itself and any neighboring access points (e.g., with respect to a given subframe boundary or radio frame boundary), and then send such a synchronization advertisement message to the access terminal 120. For its part, the access terminal 120, upon receiving a synchronization advertisement message, may use it to perform one or more measurements of the neighboring access points.

In the illustrated example, the synchronization advertisement message 500 includes, in relevant part, a measurement timing indicator 502, a neighborhood synchronization indicator 504, and any other indicators 506 as appropriate for a given implementation. It will be appreciated that the single synchronization advertisement message 500 is shown for illustration purposes only, and that in different designs and scenarios the various indicators may be transmitted (broadcasted or unicasted) in different sets of messages, as separate individual messages, and so on, or may be omitted entirely, as appropriate.

The measurement timing indicator 502 may be used to indicate the timing of one or more neighbor cell DTxW locations for the access terminal 120 to perform measurements, including autonomous measurements outside of scheduled measurement gaps. As an example, the measurement timing indicator 502 may be formatted in terms of an absolute time (e.g., Universal Coordinated Time (UTC)) or with reference to a corresponding frame/subframe of the access point 110. As another example, the measurement timing indicator 502 may be formatted in terms of a set of measurement offsets relative to the DTxW of the access point 110. For example, a measurement offset set {t1, t2, . . . } may be used to indicate that the DTxW of a first neighbor cell is offset from the DTxW of the access point 110 by an amount of time t1, the DTxW of a second neighbor cell is offset from the DTxW of the access point 110 by an amount of time t2, and so on. Here, it will be appreciated that the values t1, t2, etc., may be positive or negative, and that different measurement offset sets may be provided for different frequencies. The measurement timing indicator 502 allows measurement opportunities to be specified even when neighbor cells are not synchronized.

The neighborhood synchronization indicator 504 may be used to indicate the level of DTxW synchronization among neighbor cells within the network to assist the access terminal 120 in performing autonomous measurements. The neighborhood synchronization indicator 504 may be formatted to indicate different levels of detail as desired, including as a single-bit flag to convey a general synchronized or not synchronized indication (e.g., broadcast as part of a System Information Block (SIB) such as eSIB-1 or unicast as part of a Radio Resource Control (RRC) reconfiguration message or RRC connection setup complete message). For example, a '1' bit may indicate a tight synchronization with one or more neighboring cells and a '0' bit may indicate a loose synchronization or no synchronization. This indication can be common across frequencies or provided on a per-frequency basis.

The access terminal 120 may utilize the neighborhood synchronization indicator 504 to optimize RRM measurements in a variety of ways. As an example, the access terminal 120 may decide whether to autonomously perform inter-frequency RRM measurements even in the absence of measurement gaps configured by the access point 110 based on the neighborhood synchronization indicator 504. For example, if the access terminal 120 has an additional radio frequency chain (receiver circuitry, etc.) and the neighborhood synchronization indicator 504 indicates a low level of synchronization across neighbor cells, the access terminal 120 may enable autonomous inter-frequency RRM measurements when appropriate (e.g., when not being scheduled or in an inactivity mode such as Discontinuous Reception (DRX)). Conversely, when the neighborhood synchronization indicator 504 indicates a high level of synchronization across neighbor cells, the inter-frequency measurement gaps configured by the access point 110 may be sufficient and the access terminal 120 may therefore disable autonomous inter-frequency RRM measurements to conserve power.

In some designs, the access terminal 120 may report any DTxW timing for neighbor cells that it discovers, either on an aggregated or per-cell basis. This information may be used by the access point 110 to assist other access terminals that may not have autonomous measurement capabilities or may desire to conserve power.

Returning to FIG. 1, in some deployments, the central coordination server 180 may partition the communication medium 140 into respective portions for the operator A system 100 and the operator B system 150 to mitigate the interference therebetween. The central coordination server 180 may communicate the partitioning to the operator A system 100 over the respective backhaul link 182 and to the operator B system 150 over the respective backhaul link 184. Spectrum partitioning may be inefficient (e.g., lower capacity), however, particularly when the operator A system 100 and/or the operator B system 150 support OTA co-existence or coordination mechanisms such as LBT. At the same time, OTA co-existence mechanisms may be themselves inefficient under certain conditions and scenarios, such as when the potential for interference is relatively minor.

Figure 6:
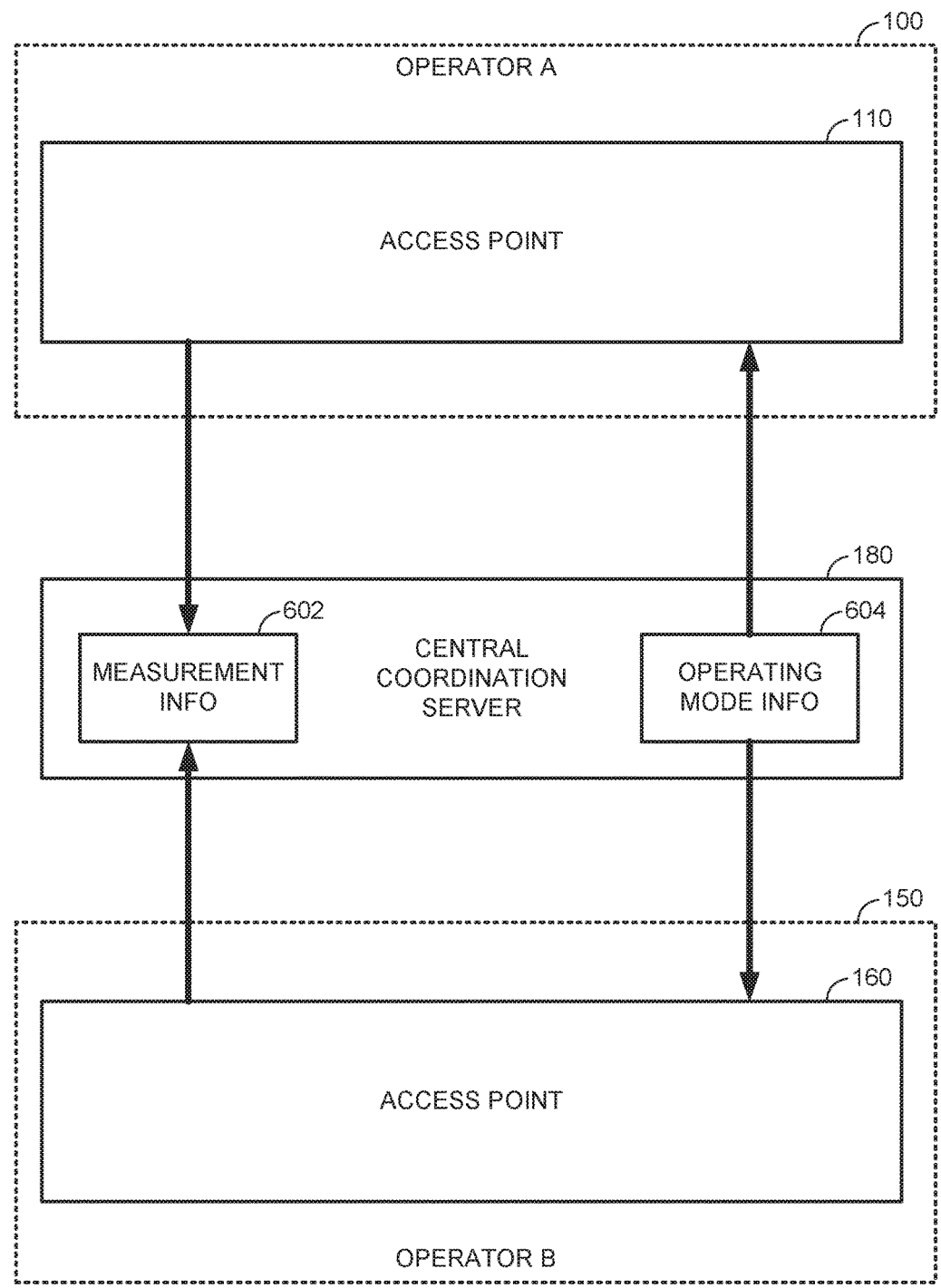
FIG. 6 is a system-level diagram illustrating an information exchange with a central coordination server.

FIG. 6 is a system-level diagram illustrating an information exchange with the central coordination server 180. As shown, the central coordination server 180 may exchange information with devices in the operator A system 100, shown by way of example as the access point 110, and with devices in the operator B system 150, shown by way of example as the access point 160.

Typically, operational parameters of access points and access terminals are controlled by an Operations and Management (OAM) system, which belongs to a particular operator. However, to facilitate co-existence and better operation in multi-operator deployments, some of the parameters and functions can be controlled or at least promoted by the central coordination server 180 to appropriately choose parameters for all operators in a given neighborhood. It will be appreciated that although the description below may relate to inter-operator coordination, the various techniques may be applied to intra-operator coordination where the operator of two or more access points being coordinated is the same.

As shown in FIG. 6, the central coordination server 180 may receive information such as measurement information 602 from the access point 110 and/or the access point 160, and may send operating mode information 604 to the access point 110 and/or the access point 160. In this way, the central coordination server 180 can assist access points (and their access terminals) from different operators in choosing a mode of operation and corresponding communication parameters.

In general, the central coordination server 180 can either (i) choose the mode and communication parameters for an access point or a group of access points or (ii) inform the access point of the neighborhood conditions (e.g., only a single operator on given channel) and allow the access point to choose its own mode of operation, which can then be communicated back to the central coordination server 180 as well as to other access points (via a backhaul or OTA signaling exchange). In the latter case, the access points can then appropriately adjust their mode of operation and parameters. For example, if no LBT is to be performed, an access point may reduce the size of its paging window, reference signal transmission window (DTxW), etc., to facilitate access terminal battery life savings. The access point can also inform its access terminals about the operating mode and appropriately configure their operation (e.g., inform the access terminal that no LBT is required for transmissions). An access terminal can also adjust its operation accordingly (e.g., avoid automatic background searches of intra/inter-frequency neighbors).

Figure 7:
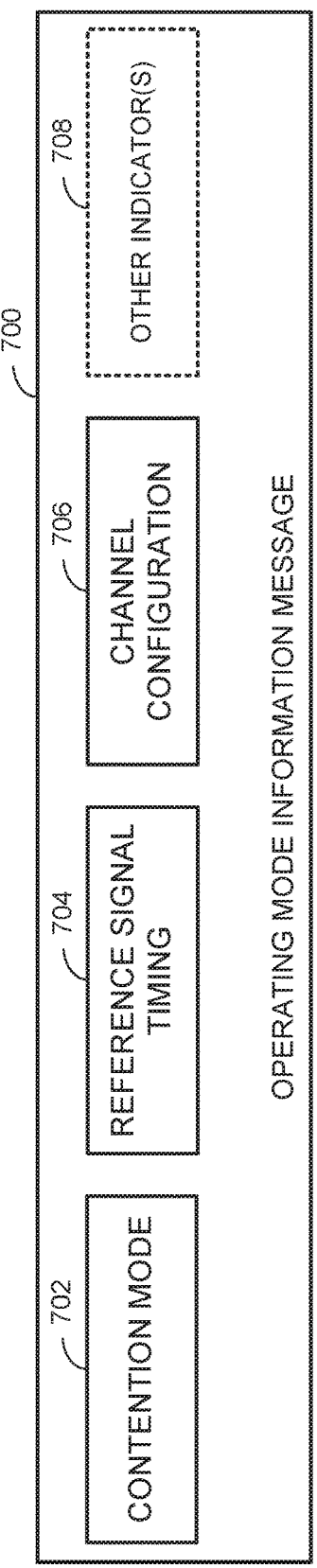
FIG. 7 illustrates an example operating mode information message.

FIG. 7 illustrates an example operating mode information message. In this example, the operating mode information message 700 includes, in relevant part, a contention mode indicator 702, a reference signal timing indicator 704, a channel configuration indicator 706, and any other indicators 708 as appropriate for a given implementation. It will be appreciated that the operating mode information message 700 may be sent directly to the access point 110 and/or the access point 160, as shown in FIG. 6, or indirectly to the access terminal 120 and/or the access terminal 170 (e.g., via the access point 110 or the access point 160, respectively), in a similar or modified format as appropriate. It will also be appreciated that the single operating mode information message 700 is shown for illustration purposes only, and that in different designs and scenarios the various indicators may be transmitted (broadcasted or unicasted, over the backhaul or over the air) in different sets of messages, as separate individual messages, and so on, or may be omitted entirely, as appropriate.

The contention mode indicator 702 may be used to indicate whether and to what extent contention is in effect for transmission on the communication medium 140 (e.g., via a predetermined category or the like defining different types of contention). For example, the contention mode indicator 702 may indicate that no contention is in effect (e.g., so-called "Category 1" LBT), that contention without random back-off is in effect (e.g., so-called "Category 2" LBT), that contention with random back-off having a fixed-size contention window is in effect (e.g., so-called "Category 3" LBT), that contention with random back-off having a variable-size contention window is in effect (e.g., so-called "Category 4" LBT), and so on. Accordingly, based on the contention mode indicator 702, the receiving device (e.g., the access point 110, the access point 160, the access terminal 120, or the access terminal 170) may selectively contend for access to the communication medium 140, rather than being preprogrammed to perform or not perform contention.

Dynamic contention mode signaling provides flexibility for operating under different deployment conditions and scenarios. For example, it may be desirable in some instances to operate without contention. If all access points utilizing a particular channel on the communication medium 140 belong to the same operator, no OTA LBT may be required for co-existence with other operators. The central coordination server 180 may determine this based on a location database of access points, measurement reports from access points and their associated access terminals reported in some form to the central coordination server 180, and so on. As another example, in some instances it may be desirable to operate with contention. This may be more suitable in the presence of devices belonging to multiple operators. As another example, it may be desirable to operate with contention parameters that promote quicker access (e.g., a higher energy detection threshold, reduced contention window size, etc.).

The contention mode indicator 702 may also be used to configure LBT parameters of various devices according to their characteristics. For example, a larger contention window size may be used for higher power access points. Because the higher power may silence many other devices, a large contention window can be used to increase access to the communication medium 140 by other lower power devices. As another example, LBT parameters may also be derived based on transmission power levels configured by the central coordination server 180. The central coordination server 180 may also inform various devices about the traffic load of other operator devices, such that their co-existence parameters may be adapted accordingly (e.g., if a neighbor node from another operator has a higher traffic demand, the medium access rate can be adjusted to assist the neighbor node by contending for access to the communication medium 140 less often).

The reference signal timing indicator 704 may be used to assign reference signal locations. For example, it may be used to indicate DTxW locations and lengths that are staggered across operators. The central coordination server 180 may assign DTxW locations (e.g., radio frames) and lengths such that DRS transmissions from two operators are orthogonalized in time, as well as reduce or disable any transmission from other operator devices in DRS opportunities of the first operator. This ensures that DRS is transmitted without delays incurred due to LBT, and also without any other operator interference. Based on knowledge of a time synchronization across operators, the central coordination server 180 may also configure periodic "anchor" subframes largely guaranteed to be available (e.g., via aggressive contention or no contention) to be orthogonal across operators and reduce or bar any transmission from other operators in such subframes (e.g., via a reduced transmission power).

Figure 8:
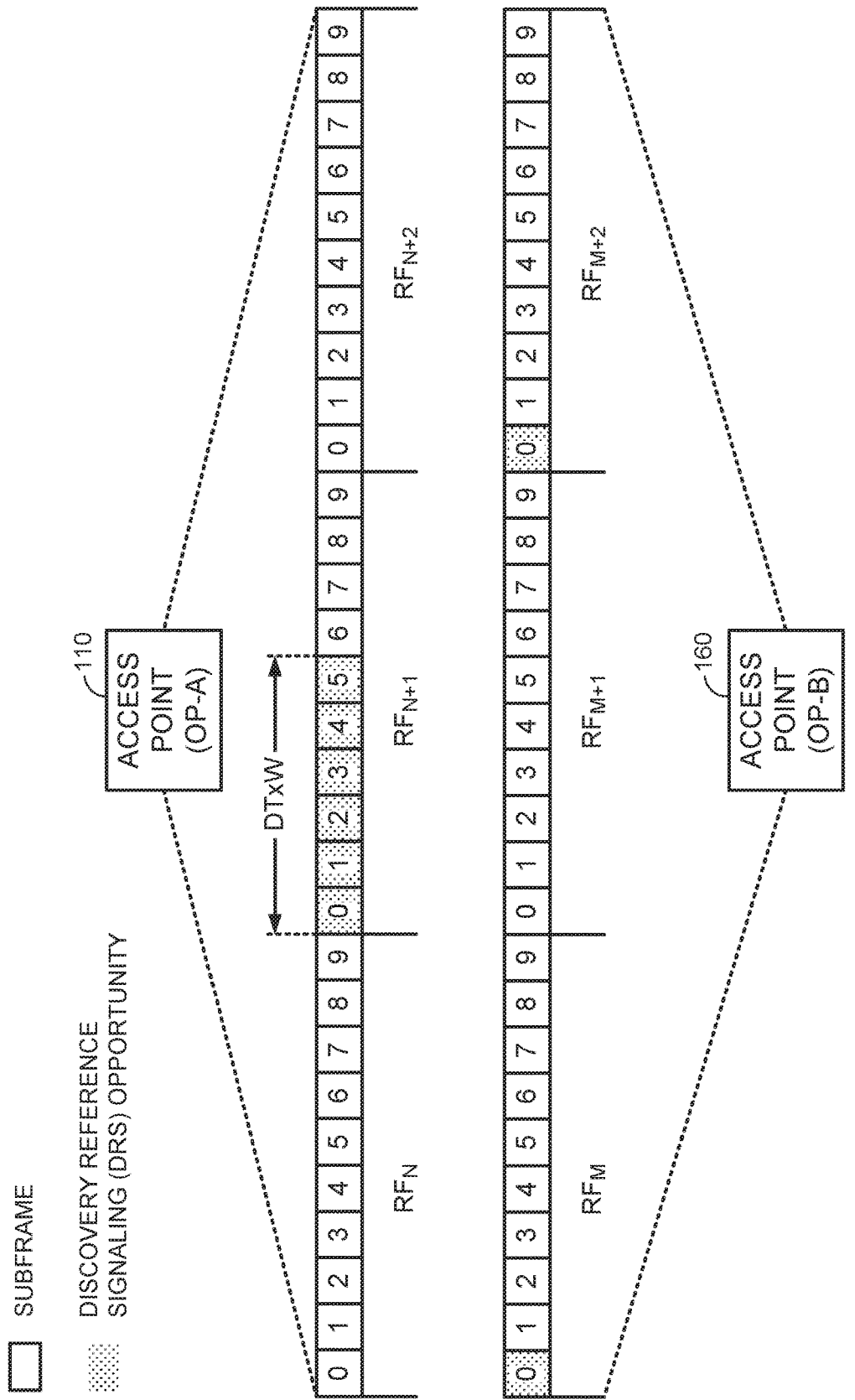
FIG. 8 illustrates inter-operator DRS and corresponding DRS Transmission Window (DTxW) staggering.

FIG. 8 illustrates inter-operator DRS and corresponding DTxW staggering. In this example, the access point 110 and the access point 160 are shown for illustration purposes, with the access point 110 corresponding to a first operator A (OP-A) and the access point 160 corresponding to a second operator B (OP-B). As in the example of FIG. 2, the illustrated frame structure includes a series of radio frames ($RF_N$, $RF_{N+1}$, and $RF_{N+2}$ for OP-A and $RF_M$, $RF_{M+1}$, and $RF_{M+2}$ for OP-B, where N and M may be same when both operators have tight synchronization with each other) that may be divided into respective subframes, with one or more subframes being designated to include DRS. The DRS may be scheduled for transmission periodically (e.g., every 10 ms) in a designated subframe(s) of each radio frame or in a DTxW range of such subframes.

As shown, the DTxW for the access point 110 (OP-A) may be scheduled for a radio frame ($RF_{N+1}$) in which no DRS is scheduled for the access point 160 (OP-B) ($RF_{M+1}$). Conversely, DRS for the access point 160 (OP-B) may be scheduled for radio frames ($RF_M$ and $RF_{M+2}$) in which no DRS is scheduled for the access point 110 (OP-A) ($RF_N$ and $RF_{N+1}$).

Returning to FIG. 7, the channel configuration indicator 706 may be used to indicate different operating channels (frequencies) for different OTA co-existence schemes. The central coordination server 180 may configure operating channel(s) for various devices depending on their support of OTA co-existence schemes. As an example, access points not supporting OTA co-existence may be configured on one channel, while access points supporting OTA co-existence may be configured on a separate channel. As another example, the number of channels configured for a given device may be based on its support of OTA co-existence. Access points supporting OTA co-existence may be configured with more channels as they can react dynamically and share the spectrum with other nodes, while access points not supporting OTA co-existence may be configured with a smaller number of channels.

The central coordination server 180 may also configure periodic downlink subframes for paging and other important information transmission such that the transmissions are orthogonalized and not interfered with by other-operator devices (e.g., by reducing the transmission power of other devices in such subframes).

The central coordination server 180 may also configure periodic uplink subframes for a Random Access Channel (RACH) and other important message exchanges (e.g., handover messages).

Figure 9:
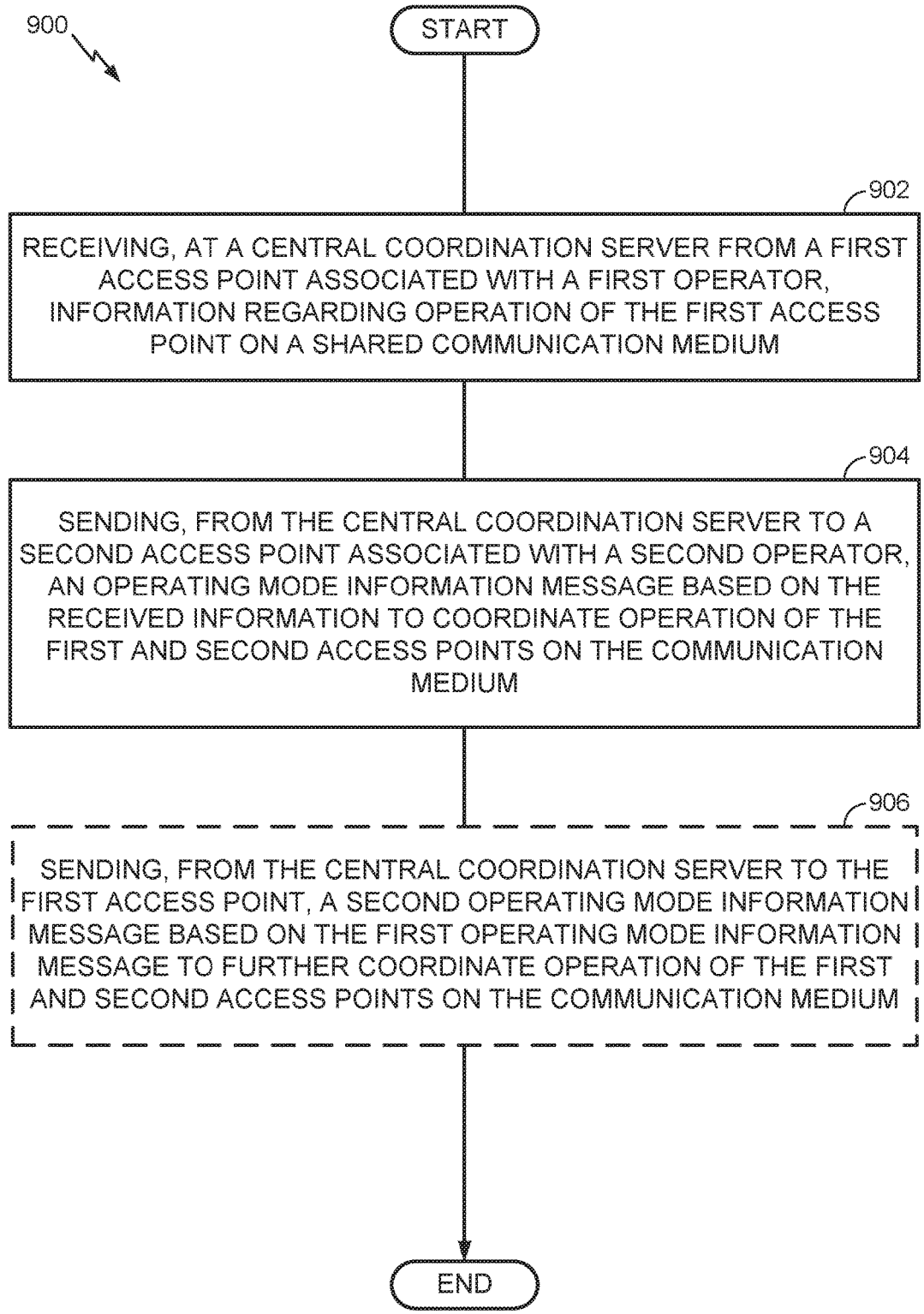
FIG. 9 is a flow diagram illustrating an example method of communication in accordance with the techniques described herein.

FIG. 9 is a flow diagram illustrating an example method of communication in accordance with the techniques described above. The method 900 may be performed, for example, by a central coordination server (e.g., the central coordination server 180 illustrated in FIG. 1) coordinating operation on a shared communication medium. As an example, the communication medium may include one or more time, frequency, or space resources on an unlicensed radio frequency band shared between LTE technology and Wi-Fi technology devices.

As shown, the central coordination server may receive, from a first access point associated with a first operator, information regarding operation of the first access point on a shared communication medium (block 902). The central coordination server may send, to a second access point associated with a second operator, an operating mode information message based on the received information to coordinate operation of the first and second access points on the communication medium (block 904).

As described in more detail above, the operating mode information message may include, for example, a contention mode indicator that indicates whether and to what extent contention is in effect for transmission on the communication medium. For example, the contention mode indicator may identify an LBT category. As another example, the contention mode indicator may identify an energy detection threshold, a contention window size, or a combination thereof.

In addition or as an alternative, the operating mode information message may include, for example, a reference signal timing indicator that assigns reference signal locations for the second access point. For example, the reference signal timing indicator may assigns DTxW locations and lengths for the second access point that are staggered in time with respect to the first access point.

In addition or as an alternative, the operating mode information message may include, for example, a channel configuration indicator that indicates different operating channel frequencies for different OTA co-existence schemes. For example, the channel configuration indicator may indicate (i) a first operating channel frequency for access points that operate with contention in effect for transmission on the communication medium and (ii) a second operating channel frequency for access points that operate without contention in effect for transmission on the communication medium.

In general, the first operator and the second operator may be the same or different.

As further shown in FIG. 9, the central coordination server may also (optionally) send, to the first access point, a second operating mode information message based on the first operating mode information message to further coordinate operation of the first and second access points on the communication medium (optional block 906).

Figure 10:
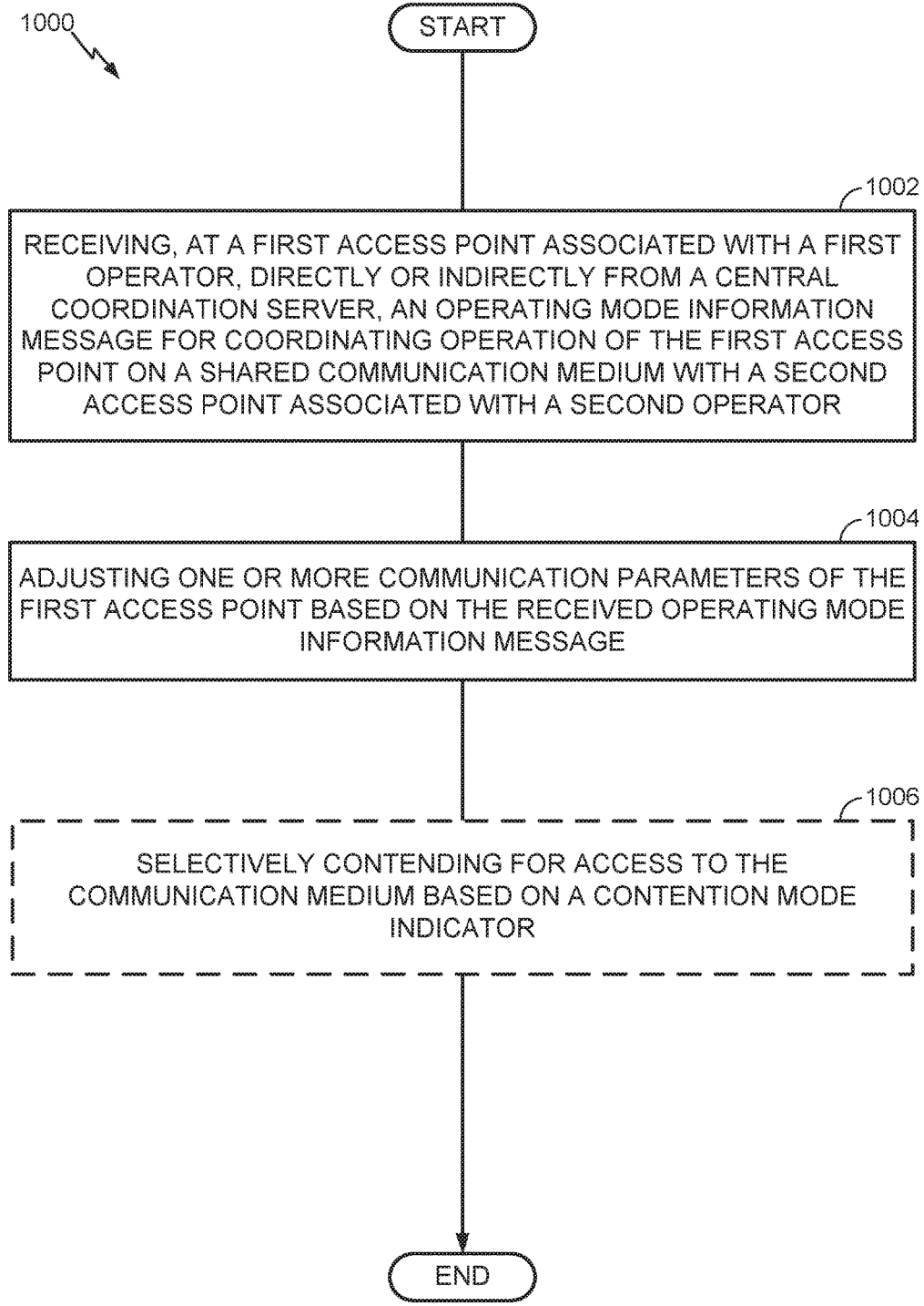
FIG. 10 is a flow diagram illustrating an example method of communication in accordance with the techniques described herein.

FIG. 10 is a flow diagram illustrating another example method of communication in accordance with the techniques described above. The method 1000 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the (first) access point, associated with a first operator, may receive, directly or indirectly from a central coordination server, an operating mode information message for coordinating operation of the first access point on a shared communication medium with a second access point associated with a second operator (block 1002). The first access point may then adjust one or more communication parameters of the first access point based on the received operating mode information message (block 1004).

As discussed in more detail above, the operating mode information message may include, for example, a contention mode indicator that indicates whether and to what extent contention is in effect for transmission on the communication medium. For example, the contention mode indicator may identify an LBT category. As another example, the contention mode indicator may identify an energy detection threshold, a contention window size, or a combination thereof. The first access point may also (optionally) selectively contend for access to the communication medium based on the contention mode indicator (optional block 1006).

In addition or as an alternative, the operating mode information message may include, for example, a reference signal timing indicator that assigns reference signal locations for the first access point. For example, the reference signal timing indicator may assign DTxW locations and lengths for the first access point that are staggered in time with respect to the second access point.

In addition or as an alternative, the operating mode information message may include, for example, a channel configuration indicator that indicates different operating channels for different OTA co-existence schemes. For example, the channel configuration indicator may indicate (i) a first operating channel for access points that operate with contention in effect for transmission on the communication medium and (ii) a second operating channel for access points that operate without contention in effect for transmission on the communication medium. The first access point may select the first or second operating channel for itself based on a contention mode employed by the first access point, and then transmit over the selected operating channel.

Figure 11:
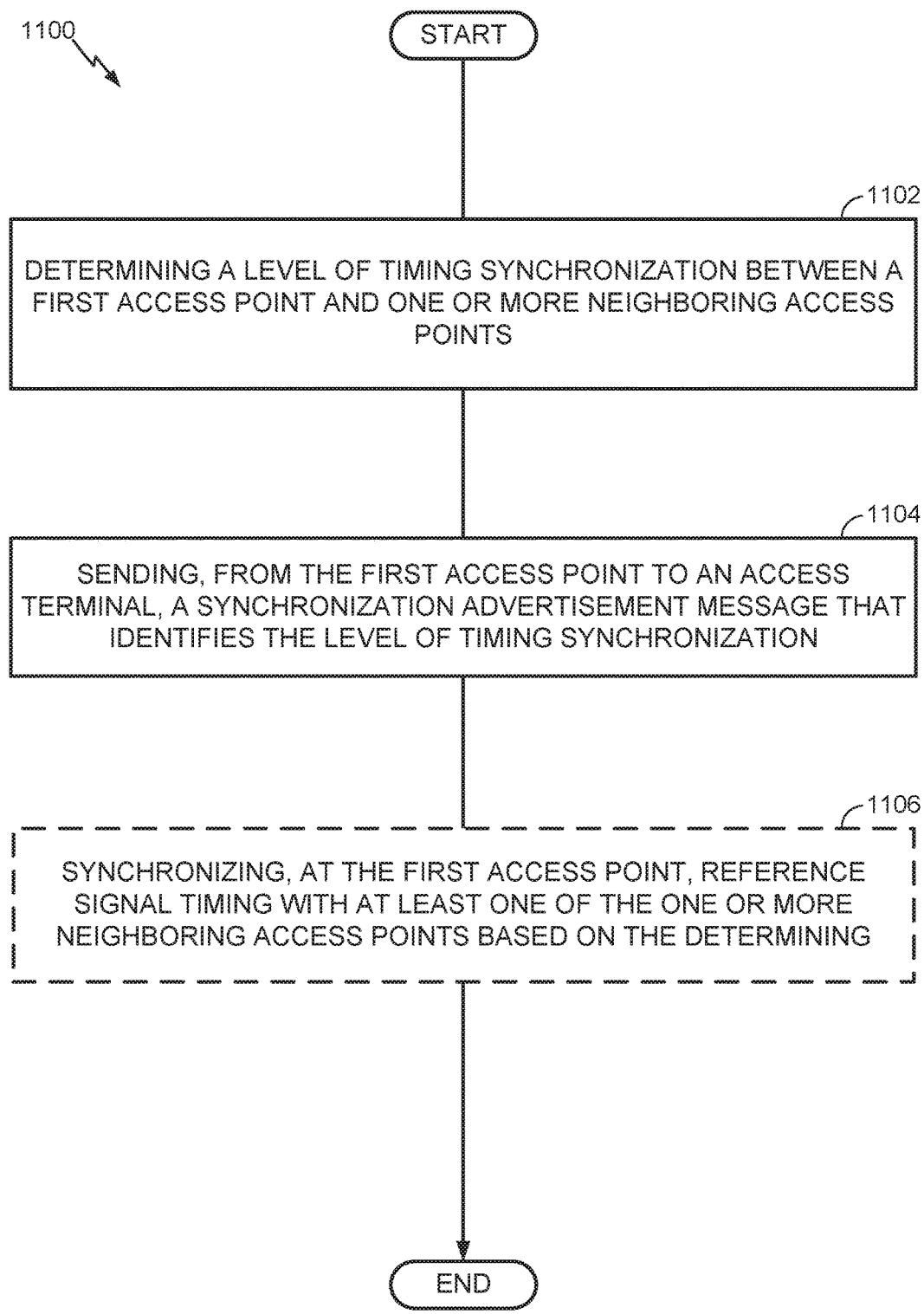
FIG. 11 is a flow diagram illustrating another example method of communication in accordance with the techniques described herein.

FIG. 11 is a flow diagram illustrating an example method of communication in accordance with the techniques described above. The method 1100 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the (first) access point may determine a level of timing synchronization between itself and one or more neighboring access points (block 1102). The first access point may then send, to an access terminal, a synchronization advertisement message that identifies the level of timing synchronization (block 1104).

As discussed in more detail above, the level of timing synchronization may correspond, for example, to a level of timing synchronization associated with a DTxW. For example, the synchronization advertisement message may include a measurement timing indicator that indicates a location of one or more DTxW measurement opportunities for the access terminal to perform measurements on the one or more neighboring access points. As another example, the synchronization advertisement message may include a neighborhood synchronization indicator that indicates a level of DTxW synchronization among the one or more neighboring access points.

In some designs or scenarios, the determining (block 1102) may comprise, for example, receiving a backhaul signal from the one or more neighboring access points or from a remote server; monitoring over-the-air signaling from the one or more neighboring access points; or self-determining based on an absence of synchronization information.

As further shown in FIG. 11, the first access point may also (optionally) synchronize its reference signal timing with at least one of the one or more neighboring access points based on the determining (optional block 1106). As an example, the reference signal timing may correspond to timing of a DTxW. Here, the synchronizing (optional block 1106) may comprise synchronizing the DTxW of the first access point and the at least one of the one or more neighboring access points to within a margin. More specifically, the synchronizing (optional block 1106) may comprise synchronizing a first DTxW of the first access point, on a first frequency over which the first access point serves the access terminal, with the DTxW of the at least one of the one or more neighboring access points to within a first margin; and synchronizing a second DTxW of the first access point, on a second frequency over which the first access point does not serve the access terminal, with the DTxW of the at least one of the one or more neighboring access points to within a second margin, wherein the second margin is smaller than the first margin.

As also discussed in more detail above, the level of timing synchronization may correspond, for example, to a level of timing synchronization associated with subframe boundaries or radio frame boundaries.

Figure 12:
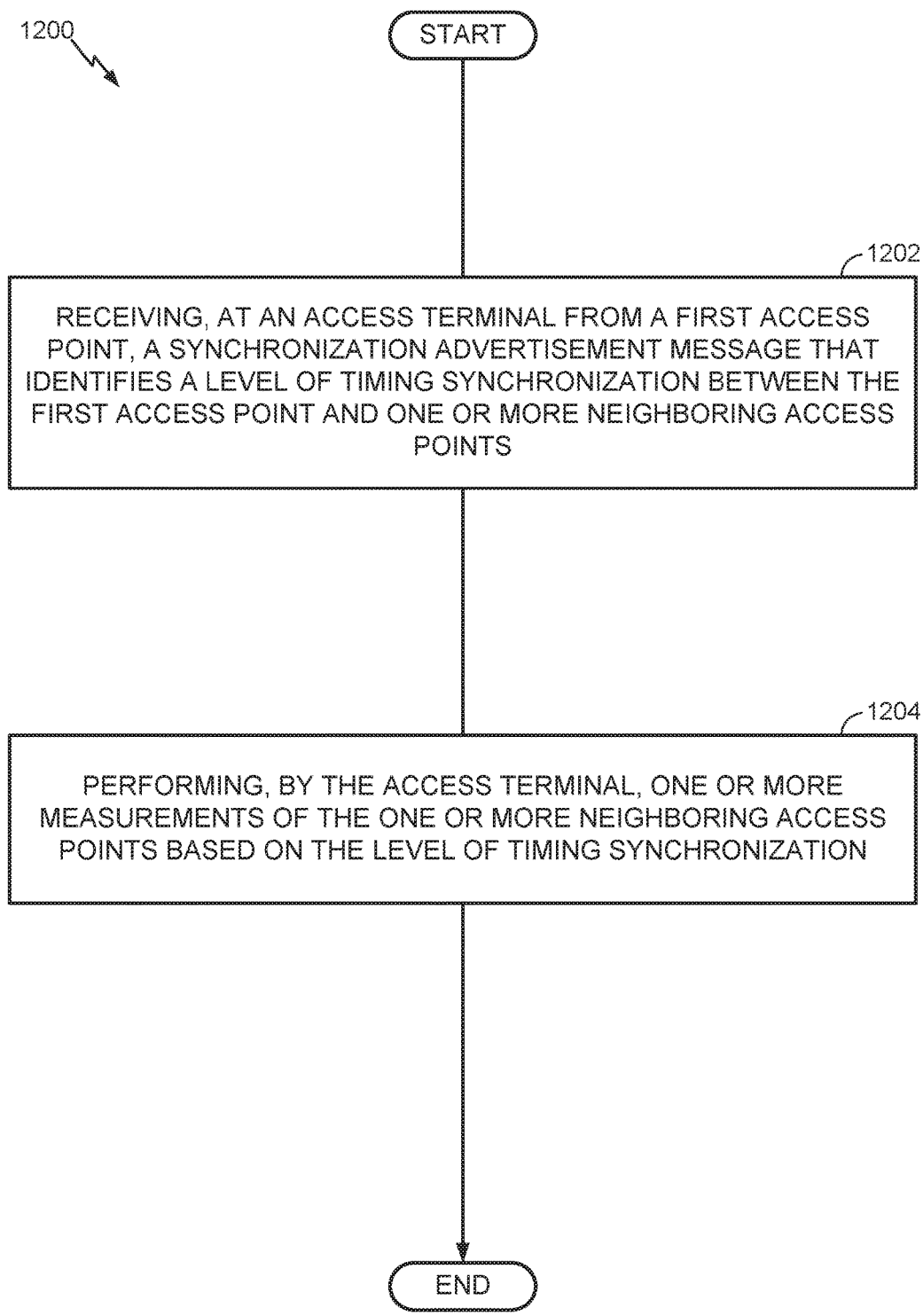
FIG. 12 is a flow diagram illustrating another example method of communication in accordance with the techniques described herein.

FIG. 12 is a flow diagram illustrating an example method of communication in accordance with the techniques described above. The method 1200 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive, from a first access point, a synchronization advertisement message that identifies a level of timing synchronization between the first access point and one or more neighboring access points (block 1202). The access terminal may then perform one or more measurements of the one or more neighboring access points based on the level of timing synchronization (block 1204).

As discussed in more detail above, the level of timing synchronization may correspond, for example, to a level of timing synchronization associated with a DTxW. As an example, the synchronization advertisement message may include a measurement timing indicator that indicates a location of one or more DTxW measurement opportunities for the access terminal to perform the one or more measurements. As another example, the synchronization advertisement message may include a neighborhood synchronization indicator that indicates a level of DTxW synchronization among the one or more neighboring access points.

The one or more measurements comprise one or more RRM measurements. In response to the synchronization advertisement message indicating a substantial level of synchronization (e.g., synchronization to within a threshold) between the first access point and the one or more neighboring access points, the access terminal may perform the one or more measurements during a DTxW of the first access point. In response to the synchronization advertisement message indicating a location of the DTxW of at least one of the one or more neighboring access points, the access terminal may perform the one or more measurements during a DTxW of the at least one of the one or more neighboring access points. In response to the synchronization advertisement message indicating a less than substantial level of synchronization (e.g., synchronization to less than a threshold amount) between the first access point and the one or more neighboring access points, the access terminal may perform the one or more measurements autonomously.

For generality, the access point 110, the access terminal 120, and the central coordination server 180 are shown in FIG. 1 only in relevant part as including the coordination manager 112, the coordination manager 122, and the coordination manager 186 respectively. It will be appreciated, however, that the access point 110 and the access terminal 120 may be configured in various ways to provide or otherwise support the coordination techniques discussed herein.

Figure 13:
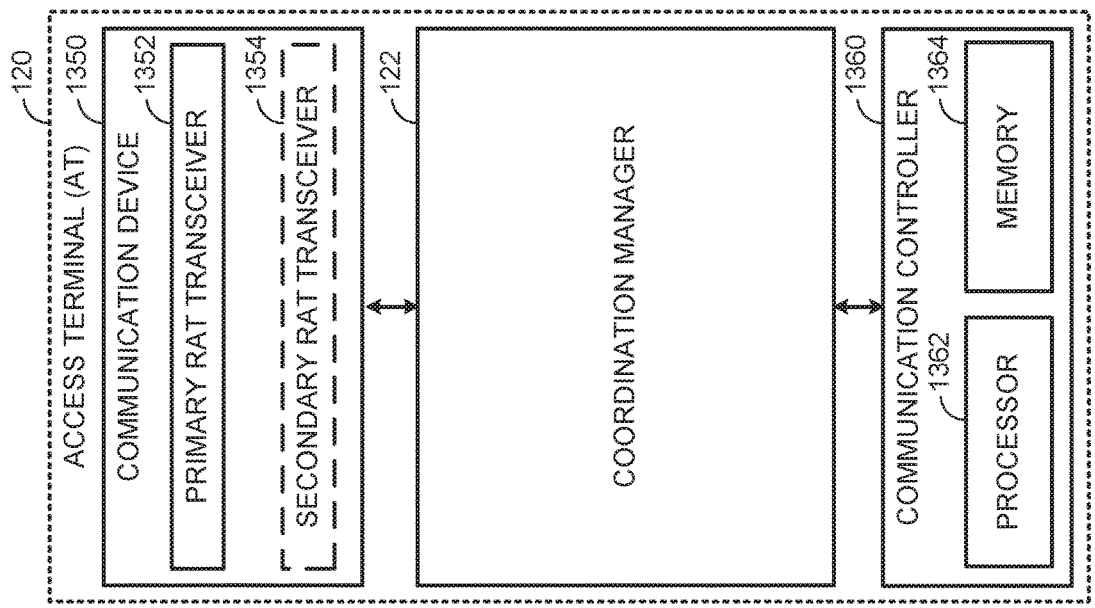
FIG. 13 is a device-level diagram illustrating example components of an access point and an access terminal in more detail.
Figure 13:
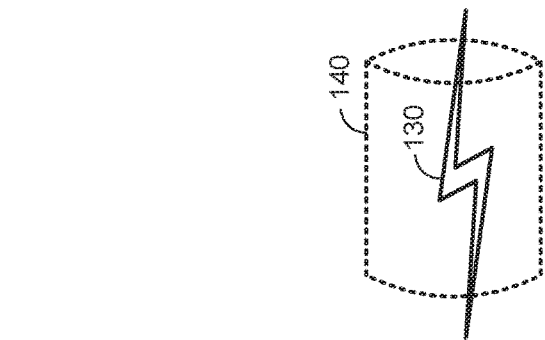
Figure 13:
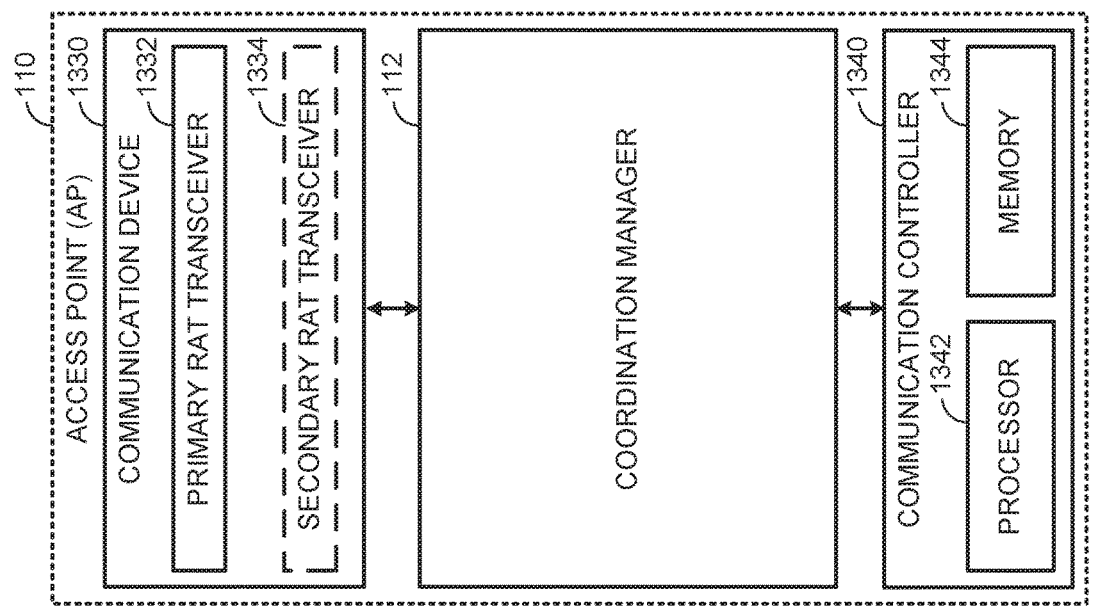

FIG. 13 is a device-level diagram illustrating example components of the access point 110 and the access terminal 120 in more detail. As shown, the access point 110 and the access terminal 120 may each generally include a wireless communication device (represented by the communication devices 1330 and 1350) for communicating with other wireless nodes via at least one designated RAT. The communication devices 1330 and 1350 may be variously configured for transmitting and encoding signals, and, conversely, for receiving and decoding signals in accordance with the designated RAT (e.g., messages, indications, information, pilots, and so on).

The communication devices 1330 and 1350 may include, for example, one or more transceivers, such as respective primary RAT transceivers 1332 and 1352, and, in some designs, (optional) co-located secondary RAT transceivers 1334 and 1354, respectively (corresponding, for example, to the RAT employed by the operator B system 150, if different than the operator A system 130). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1340 and 1360) for controlling operation of their respective communication devices 1330 and 1350 (e.g., directing, modifying, enabling, disabling, etc.). The communication controllers 1340 and 1360 may include one or more processors 1342 and 1362, and one or more memories 1344 and 1364 coupled to the processors 1342 and 1362, respectively. The memories 1344 and 1364 may be configured to store data, instructions, or a combination thereof, either as on-board cache memory, as separate components, a combination, etc. The processors 1342 and 1362 and the memories 1344 and 1364 may be standalone communication components or may be part of the respective host system functionality of the access point 110 and the access terminal 120.

It will be appreciated that the coordination manager 112 and the coordination manager 122 may be implemented in different ways. In some designs, some or all of the functionality associated therewith may be implemented by or otherwise at the direction of at least one processor (e.g., one or more of the processors 1342 and/or one or more of the processors 1362), at least one memory (e.g., one or more of the memories 1344 and/or one or more of the memories 1364), at least one transceiver (e.g., one or more of the transceivers 1332 and 1334 and/or one or more of the transceivers 1352 and 1354), or a combination thereof. In other designs, some or all of the functionality associated therewith may be implemented as a series of interrelated functional modules.

Accordingly, it will be appreciated that the components in FIG. 13 may be used to perform operations described above with respect to FIGS. 1-12.

Figure 14:
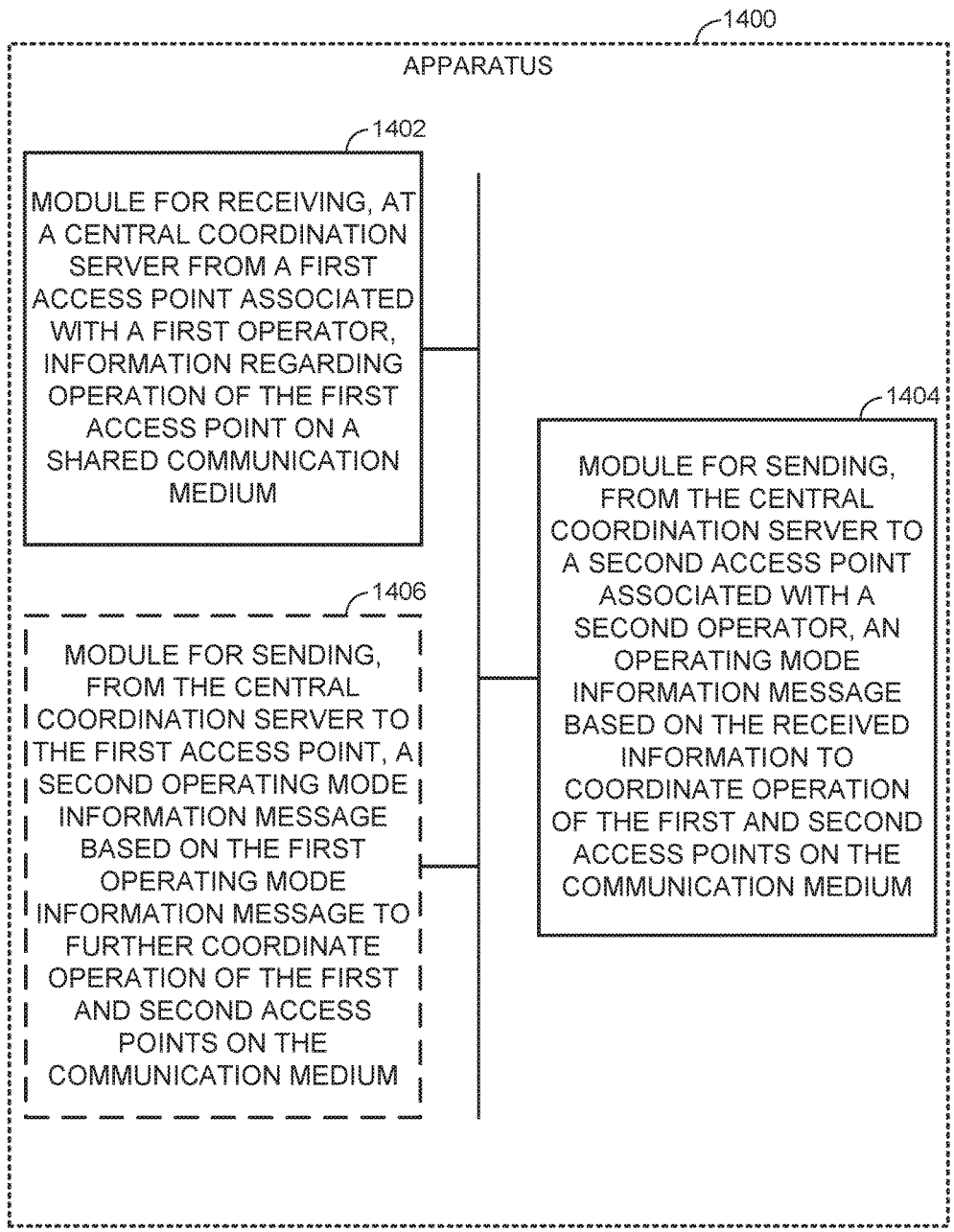
FIG. 14 illustrates an example apparatus represented as a series of interrelated functional modules.

FIG. 14 illustrates an example apparatus for implementing the coordination manager 162 represented as a series of interrelated functional modules. In the illustrated example, the apparatus 1400 includes a module for receiving 1402, a module for sending 1404, and an (optional) module for sending 1406.

The module for receiving 1402 may be configured to receive, from a first access point associated with a first operator, information regarding operation of the first access point on a shared communication medium. The module for sending 1404 may be configured to send, to a second access point associated with a second operator, an operating mode information message based on the received information to coordinate operation of the first and second access points on the communication medium. The (optional) module for sending 1406 may be configured to send, to the first access point, a second operating mode information message based on the first operating mode information message to further coordinate operation of the first and second access points on the communication medium.

Figure 15:
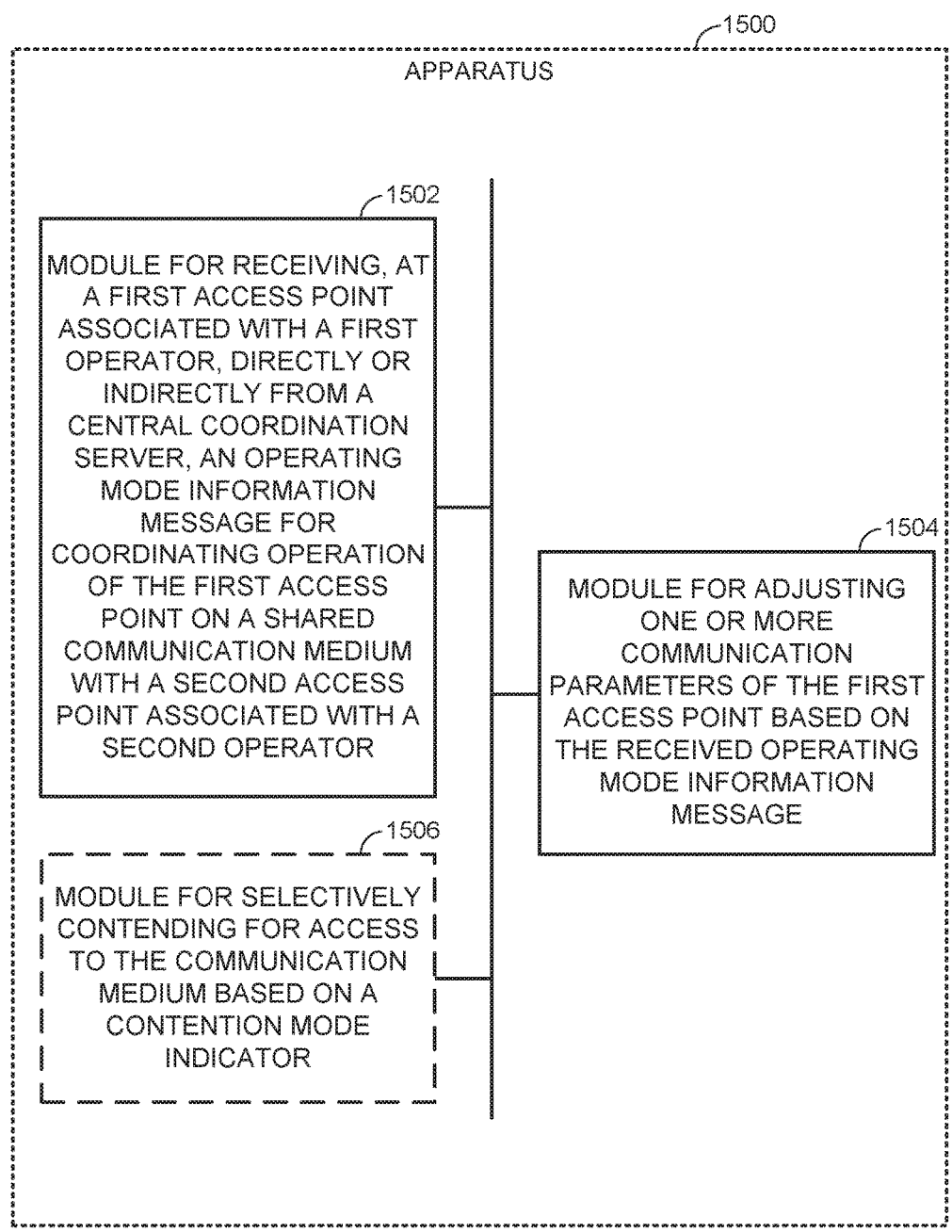
FIG. 15 illustrates another example apparatus represented as a series of interrelated functional modules.

FIG. 15 illustrates an example apparatus for implementing the coordination manager 112 represented as a series of interrelated functional modules. In the illustrated example, the apparatus 1500 includes a module for receiving 1502, a module for adjusting 1504, and an (optional) module for selectively contending 1506.

The module for receiving 1502 may be configured to receive, directly or indirectly from a central coordination server, an operating mode information message for coordinating operation of the access point on a shared communication medium with a second access point associated with a second operator. The module for adjusting 1504 may be configured to adjust one or more communication parameters based on the received operating mode information message. The (optional) module for selectively contending 1506 may be configured to selectively contend for access to the communication medium based on a contention mode indicator.

Figure 16:
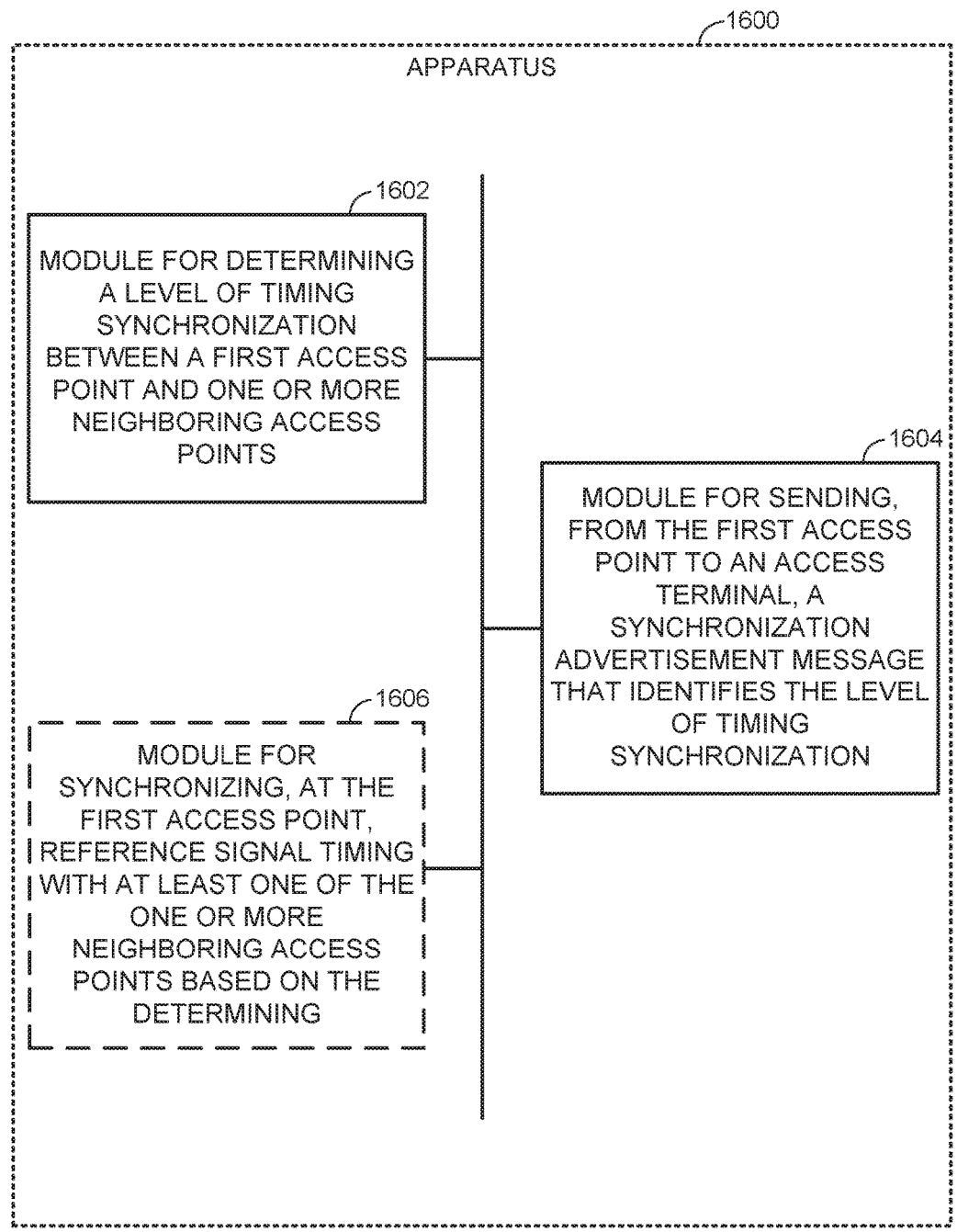
FIG. 16 illustrates another example apparatus represented as a series of interrelated functional modules.

FIG. 16 illustrates an example apparatus for implementing the coordination manager 112 represented as a series of interrelated functional modules. In the illustrated example, the apparatus 1600 includes a module for determining 1602, a module for sending 1604, and an (optional) module for synchronizing 1606.

The module for determining 1602 may be configured to determine a level of timing synchronization between the access point and one or more neighboring access points. The module for sending 1604 may be configured to send, to an access terminal, a synchronization advertisement message that identifies the level of timing synchronization. The (optional) module for synchronizing 1606 may be configured to synchronize reference signal timing with at least one of the one or more neighboring access points based on the determining.

Figure 17:
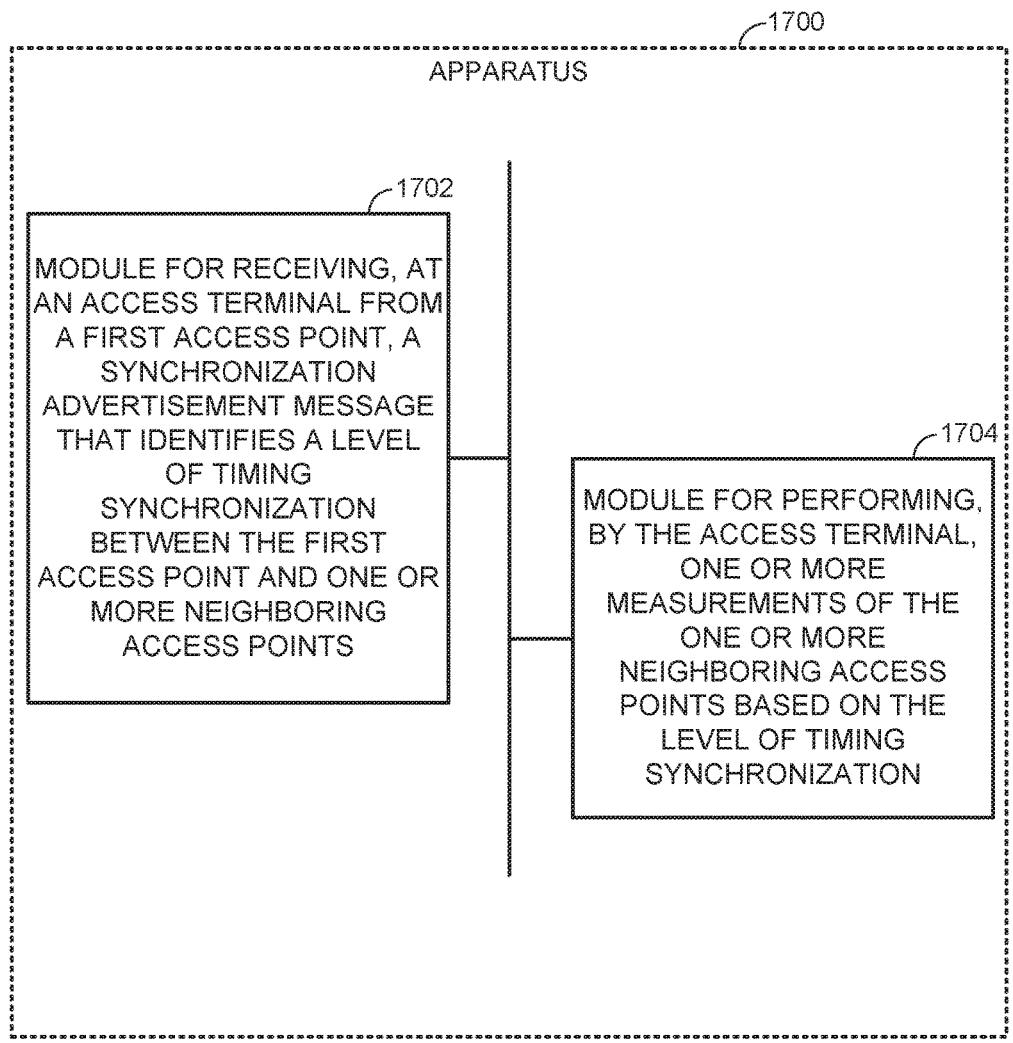
FIG. 17 illustrates another example apparatus represented as a series of interrelated functional modules.

FIG. 17 illustrates an example apparatus for implementing the coordination manager 122 represented as a series of interrelated functional modules. In the illustrated example, the apparatus 1700 includes a module for receiving 1702 and a module for performing 1706.

The module for receiving 1702 may be configured to receive, from a first access point, a synchronization advertisement message that identifies a level of timing synchronization between the first access point and one or more neighboring access points. The module for performing 1704 may be configured to perform one or more measurements of the one or more neighboring access points based on the level of timing synchronization.

The functionality of the modules of FIGS. 14-17 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14-17 as well as other components and functions described herein, may be implemented using any suitable means. Such means also may be implemented, at least in part, using corresponding structure as taught herein. For example, the components described above in conjunction with the "module for" components of FIGS. 14-17 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 14-16 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims.

The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   receiving, at a central coordination server from a first access point associated with a first operator, information regarding operation of the first access point on a shared communication medium; and
   sending, from the central coordination server to a second access point associated with a second operator, an operating mode information message based on the received information to coordinate operation of the first and second access points on the communication medium.

2. The method of claim 1, wherein the operating mode information message includes a contention mode indicator that indicates whether and to what extent contention is in effect for transmission on the communication medium.

3. The method of claim 2, wherein the contention mode indicator identifies a Listen Before Talk (LBT) category.

4. The method of claim 2, wherein the contention mode indicator identifies an energy detection threshold, a contention window size, or a combination thereof.

5. The method of claim 1, wherein the operating mode information message includes a reference signal timing indicator that assigns reference signal locations for the second access point.

6. The method of claim 5, wherein the reference signal timing indicator assigns Discovery Reference Signal (DRS) Transmission Window (DTxW) locations and lengths for the second access point that are staggered in time with respect to the first access point.

7. The method of claim 1, wherein the operating mode information message includes a channel configuration indicator that indicates different operating channel frequencies for different Over-The-Air (OTA) co-existence schemes.

8. The method of claim 7, wherein the channel configuration indicator indicates (i) a first operating channel frequency for access points that operate with contention in effect for transmission on the communication medium and (ii) a second operating channel frequency for access points that operate without contention in effect for transmission on the communication medium.

9. The method of claim 1, wherein the first operator and the second operator are the same.

10. The method of claim 1, further comprising sending, from the central coordination server to the first access point, a second operating mode information message based on the operating mode information message to further coordinate operation of the first and second access points on the communication medium.

11. A communication apparatus, comprising:
   at least one transceiver configured to receive, at a central coordination server from a first access point associated with a first operator, information regarding operation of the first access point on a shared communication medium;
   at least one processor; and
   at least one memory coupled to the at least one processor, the at least one processor and the at least one memory being configured to direct the at least one transceiver to send, from the central coordination server to a second access point associated with a second operator, an operating mode information message based on the received information to coordinate operation of the first and second access points on the communication medium.

12. The apparatus of claim 11, wherein the operating mode information message includes a contention mode indicator that indicates whether and to what extent contention is in effect for transmission on the communication medium.

13. The apparatus of claim 11, wherein the operating mode information message includes a reference signal timing indicator that assigns reference signal locations for the second access point.

14. The apparatus of claim 11, wherein the operating mode information message includes a channel configuration indicator that indicates different operating channel frequencies for different Over-The-Air (OTA) co-existence schemes.

15. The apparatus of claim 11, wherein the at least one processor and the at least one memory are further configured to direct the at least one transceiver to send, from the central coordination server to the first access point, a second operating mode information message based on the operating mode information message to further coordinate operation of the first and second access points on the communication medium.

16. A communication method, comprising:
   receiving, at a first access point associated with a first operator, directly or indirectly from a central coordination server, an operating mode information message for coordinating operation of the first access point on a shared communication medium with a second access point associated with a second operator; and
   adjusting one or more communication parameters of the first access point based on the received operating mode information message.

17. The method of claim 16, wherein the operating mode information message includes a contention mode indicator that indicates whether and to what extent contention is in effect for transmission on the communication medium.

18. The method of claim 17, wherein the contention mode indicator identifies a Listen Before Talk (LBT) category.

19. The method of claim 17, wherein the contention mode indicator identifies an energy detection threshold, a contention window size, or a combination thereof.

20. The method of claim 17, further comprising selectively contending for access to the communication medium based on the contention mode indicator.

21. The method of claim 16, wherein the operating mode information message includes a reference signal timing indicator that assigns reference signal locations for the first access point.

22. The method of claim 21, wherein the reference signal timing indicator assigns Discovery Reference Signal (DRS) Transmission Window (DTxW) locations and lengths for the first access point that are staggered in time with respect to the second access point.

23. The method of claim 16, wherein the operating mode information message includes a channel configuration indicator that indicates different operating channels for different Over-The-Air (OTA) co-existence schemes.

24. The method of claim 23, wherein the channel configuration indicator indicates (i) a first operating channel for access points that operate with contention in effect for transmission on the communication medium and (ii) a second operating channel for access points that operate without contention in effect for transmission on the communication medium.

25. The method of claim 24, further comprising:
selecting the first or second operating channel for the first access point based on a contention mode employed by the first access point; and
transmitting from the first access point over the selected operating channel.

26. A communication apparatus, comprising:
at least one transceiver configured to receive, at a first access point associated with a first operator, directly or indirectly from a central coordination server, an operating mode information message for coordinating operation of the first access point on a shared communication medium with a second access point associated with a second operator;
at least one processor; and
at least one memory coupled to the at least one processor, the at least one processor and the at least one memory being configured to adjust one or more communication parameters of the first access point based on the received operating mode information message.

27. The apparatus of claim 26, wherein the operating mode information message includes a contention mode indicator that indicates whether and to what extent contention is in effect for transmission on the communication medium.

28. The apparatus of claim 26, wherein the operating mode information message includes a reference signal timing indicator that assigns reference signal locations for the first access point.

29. The apparatus of claim 26, wherein the operating mode information message includes a channel configuration indicator that indicates different operating channels for different Over-The-Air (OTA) co-existence schemes.

30. The apparatus of claim 29, wherein the channel configuration indicator indicates (i) a first operating channel for access points that operate with contention in effect for transmission on the communication medium and (ii) a second operating channel for access points that operate without contention in effect for transmission on the communication medium.

* * * * *